United States Patent
Yoon et al.

(10) Patent No.: US 9,960,395 B2
(45) Date of Patent: May 1, 2018

(54) BATTERY MODULE

(75) Inventors: Jongmoon Yoon, Troy, MI (US); Robert Merriman, Shelby Township, MI (US); Heekook Yang, Troy, MI (US)

(73) Assignee: LG Chem, Ltd., Seoul (KR)

(*) Notice: Subject to any disclaimer, the term of this patent is extended or adjusted under 35 U.S.C. 154(b) by 264 days.

(21) Appl. No.: 13/586,960

(22) Filed: Aug. 16, 2012

(65) Prior Publication Data

US 2014/0050953 A1 Feb. 20, 2014

(51) Int. Cl.
| | |
|---|---|
| *H01M 2/12* | (2006.01) |
| *H01M 2/10* | (2006.01) |
| *H01M 10/647* | (2014.01) |
| *H01M 10/6557* | (2014.01) |
| *H01M 10/6566* | (2014.01) |
| *H01M 10/613* | (2014.01) |
| *H01M 10/6562* | (2014.01) |

(52) U.S. Cl.
CPC ........... *H01M 2/1077* (2013.01); *H01M 2/12* (2013.01); *H01M 10/613* (2015.04); *H01M 10/647* (2015.04); *H01M 10/6557* (2015.04); *H01M 10/6562* (2015.04); *H01M 10/6566* (2015.04)

(58) Field of Classification Search
CPC ............................ H01M 10/5059; H01M 2/12
USPC .......................................................... 429/82
See application file for complete search history.

(56) References Cited

U.S. PATENT DOCUMENTS

| | | | | |
|---|---|---|---|---|
| 6,159,630 | A * | 12/2000 | Wyser | 429/57 |
| 2002/0086201 | A1* | 7/2002 | Payen et al. | 429/53 |
| 2003/0017384 | A1* | 1/2003 | Marukawa et al. | 429/120 |
| 2008/0226976 | A1* | 9/2008 | Stimits | H01M 2/0222 429/131 |
| 2009/0325043 | A1* | 12/2009 | Yoon et al. | 429/90 |
| 2009/0325059 | A1 | 12/2009 | Niedzwiecki et al. | |
| 2011/0052960 | A1* | 3/2011 | Kwon et al. | 429/120 |
| 2011/0293982 | A1* | 12/2011 | Martz et al. | 429/120 |
| 2011/0293983 | A1* | 12/2011 | Oury et al. | 429/120 |
| 2012/0156542 | A1* | 6/2012 | Schaefer et al. | 429/120 |
| 2013/0071720 | A1* | 3/2013 | Zahn | H01M 2/1077 429/120 |
| 2013/0115505 | A1* | 5/2013 | Xie | H01M 2/027 429/120 |

FOREIGN PATENT DOCUMENTS

| | | |
|---|---|---|
| CN | 102263216 B | 3/2014 |
| DE | 102010021922 A1 | 12/2011 |

(Continued)

*Primary Examiner* — Miriam Stagg
*Assistant Examiner* — Brent C Thomas
(74) *Attorney, Agent, or Firm* — Buckert Patent & Trademark Law Firm PC; John F. Buckert

(57) ABSTRACT

A battery module having a first battery cell; a frame member having first and second sides and first, second, third and fourth peripheral walls; and first and second thermally conductive plate members is provided. A plurality of flow channels are formed by the first and second thermally conductive plates. The third peripheral wall has a first outlet that receives the first electrical terminal of the first battery cell therethrough, such that if the first battery cell outputs gases therefrom the first outlet routes the gases from the first battery cell to outside of the frame member such that the gases are isolated from the air flowing through the plurality of flow channels.

8 Claims, 26 Drawing Sheets

(56) References Cited

FOREIGN PATENT DOCUMENTS

| | | |
|---|---|---|
| JP | 2008159439 A | 7/2008 |
| JP | 2009021067 A | 1/2009 |
| KR | 20110116529 A | 10/2011 |
| WO | 2007043510 A1 | 4/2007 |
| WO | 2011040130 A1 | 4/2011 |
| WO | WO 2011147550 A1 * 12/2011 | .......... H01M 2/1077 |

* cited by examiner

BATTERY MODULE

BACKGROUND

The inventors herein have recognized a need for an improved battery module having separate flow paths for air cooling the battery module, and battery cell gases if present.

SUMMARY

A battery module in accordance with an exemplary embodiment is provided. The battery module includes a first battery cell having first and second electrical terminals. The battery module further includes a frame member having first and second sides, first, second, third and fourth peripheral walls, and first and second thermally conductive plate members. The first side of the frame member is disposed against the first battery cell. The first and second peripheral walls are generally parallel to one another and are disposed between and coupled to the third and fourth peripheral walls. The first, second, third and fourth peripheral walls define an open interior region therebetween. The first thermally conductive plate is coupled to the first, second, third and fourth peripheral walls to enclose the open interior region proximate to the first side of the frame member. The first thermally conductive plate is disposed against the first battery cell. The second thermally conductive plate is coupled to the first, second, third and fourth peripheral walls to enclose the open interior region proximate to the second side of the frame member such that a plurality of flow channels are formed by the first and second thermally conductive plates between the first and second thermally conductive plates. The first peripheral wall has a plurality of apertures extending therethrough that fluidly communicate with the plurality of flow channels. The second peripheral wall has a plurality of apertures extending therethrough that fluidly communicate with the plurality of flow channels, such that the first thermally conductive plate extracts heat energy from the first battery cell when air flows through the plurality of flow channels defined by the first and second thermally conductive plates. The third peripheral wall has a first outlet configured to receive the first electrical terminal of the first battery cell therethrough, such that if the first battery cell outputs gases therefrom the first outlet is further configured to route the gases from the first battery cell to outside of the frame member such that the gases are isolated from the air flowing through the plurality of flow channels.

DETAILED DESCRIPTION

Figure 1:
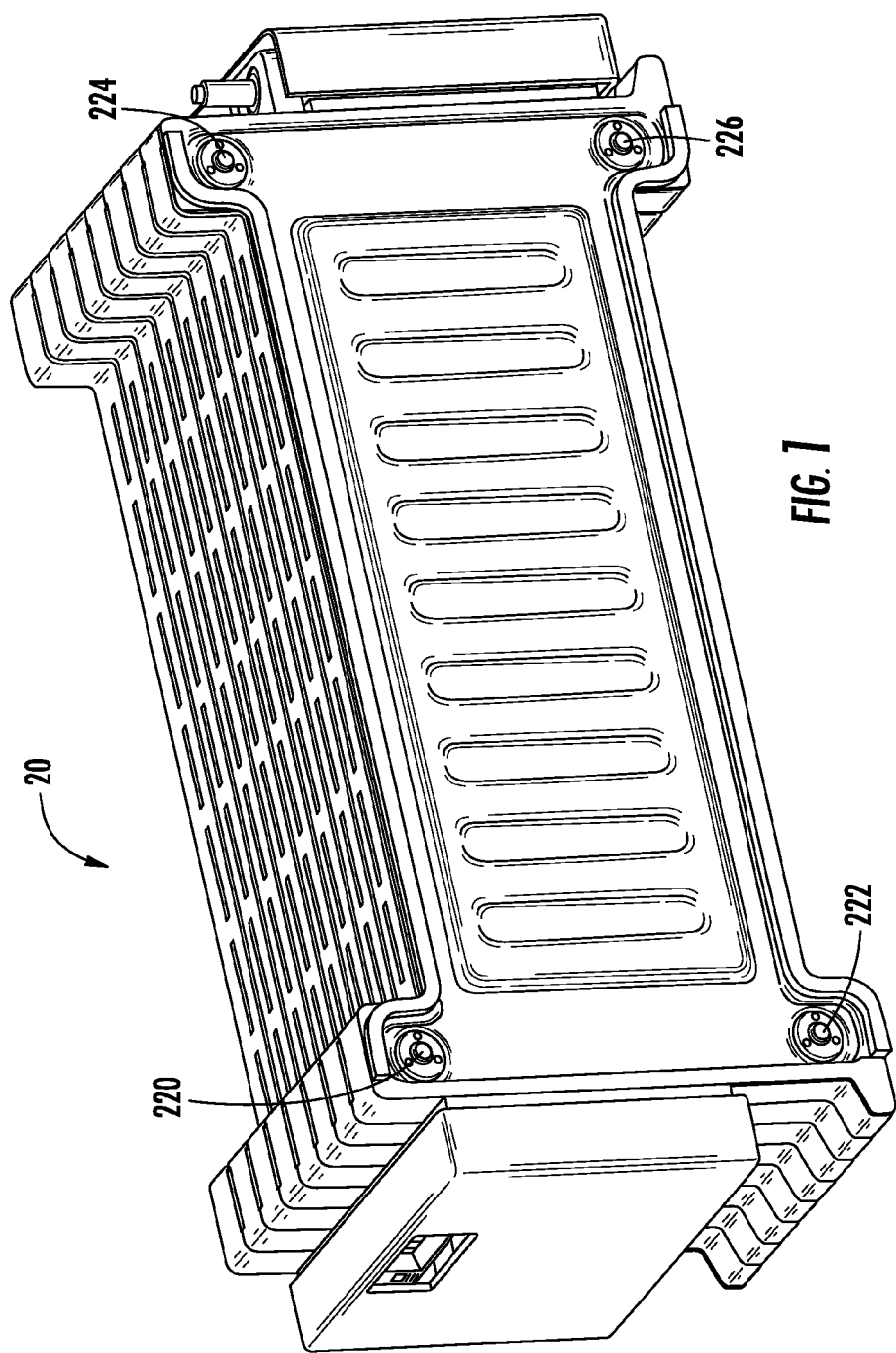
FIG. 1 is a schematic of a battery module in accordance with an exemplary embodiment.

Referring to FIGS. 1-4, a battery system 10 having a battery module 20, an air cooling system 30, and conduits 40, 42 is illustrated. The air cooling system 30 moves air through the conduit 40 and the battery module 20 and then through the conduit 42 for cooling battery cells within the battery module 20. An advantage of the battery module 20 is that the module has separate flow paths for air cooling the battery module and battery cell gases.

Referring to FIGS. 3-10, the battery module 20 includes end plates 100, 102, battery cells 120, 122, 124, 126, 128, 130, 132, 134, 136, 138, 140, 142, 144, 146, 148, 150, frame members 180, 182, 184, 186, 188, 190, 192, 194, first, second, third, and fourth shoulder bolts 220, 222, 224, 226, nuts 240, 242, 244, 246, and manifolds 260, 262.

Figure 7:
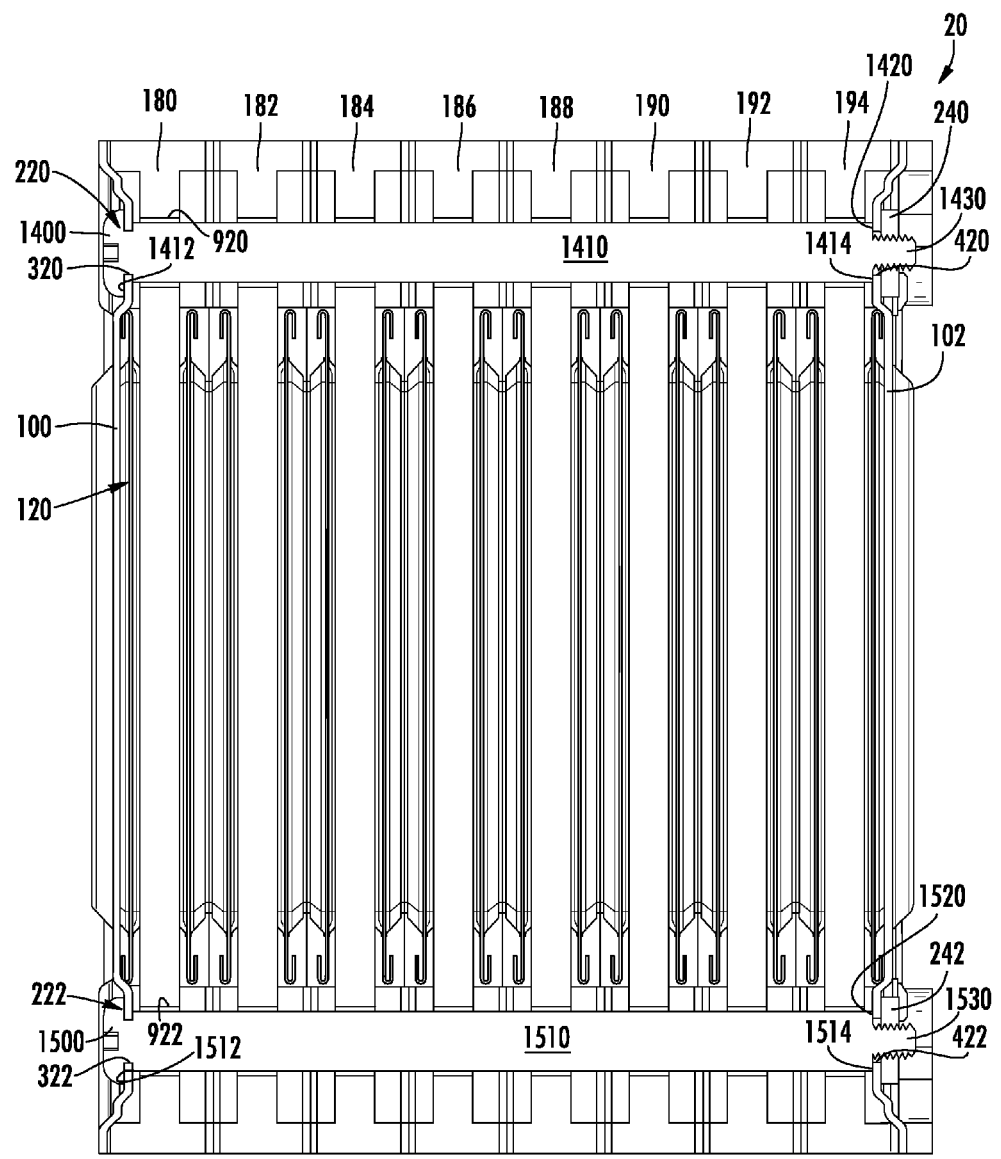
FIG. 7 is a cross-sectional schematic of the battery module of FIG. 1.
Figure 8:
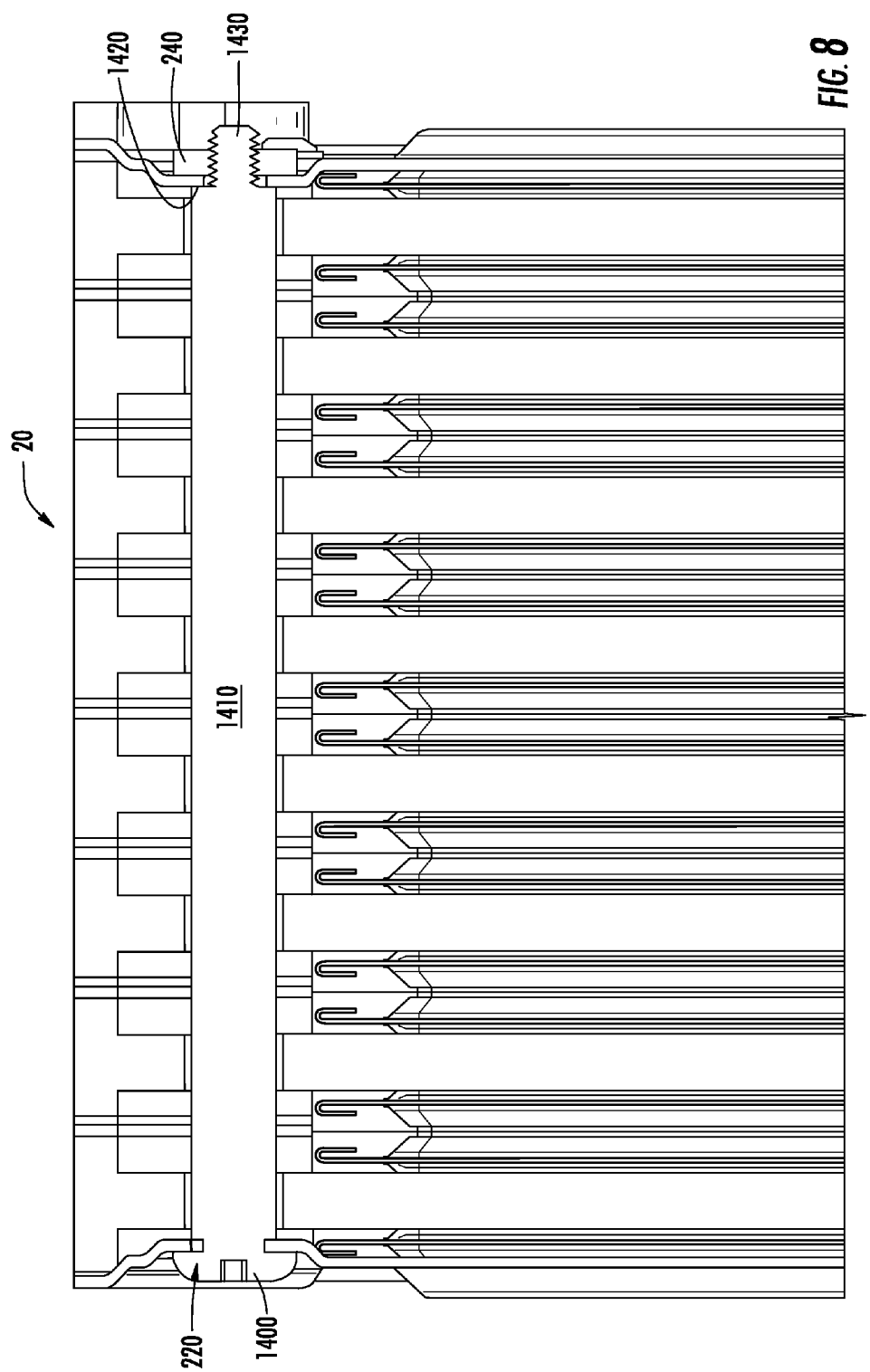
FIG. 8 is an enlarged cross-sectional schematic of a portion of the battery module of FIG. 1.
Figure 9:
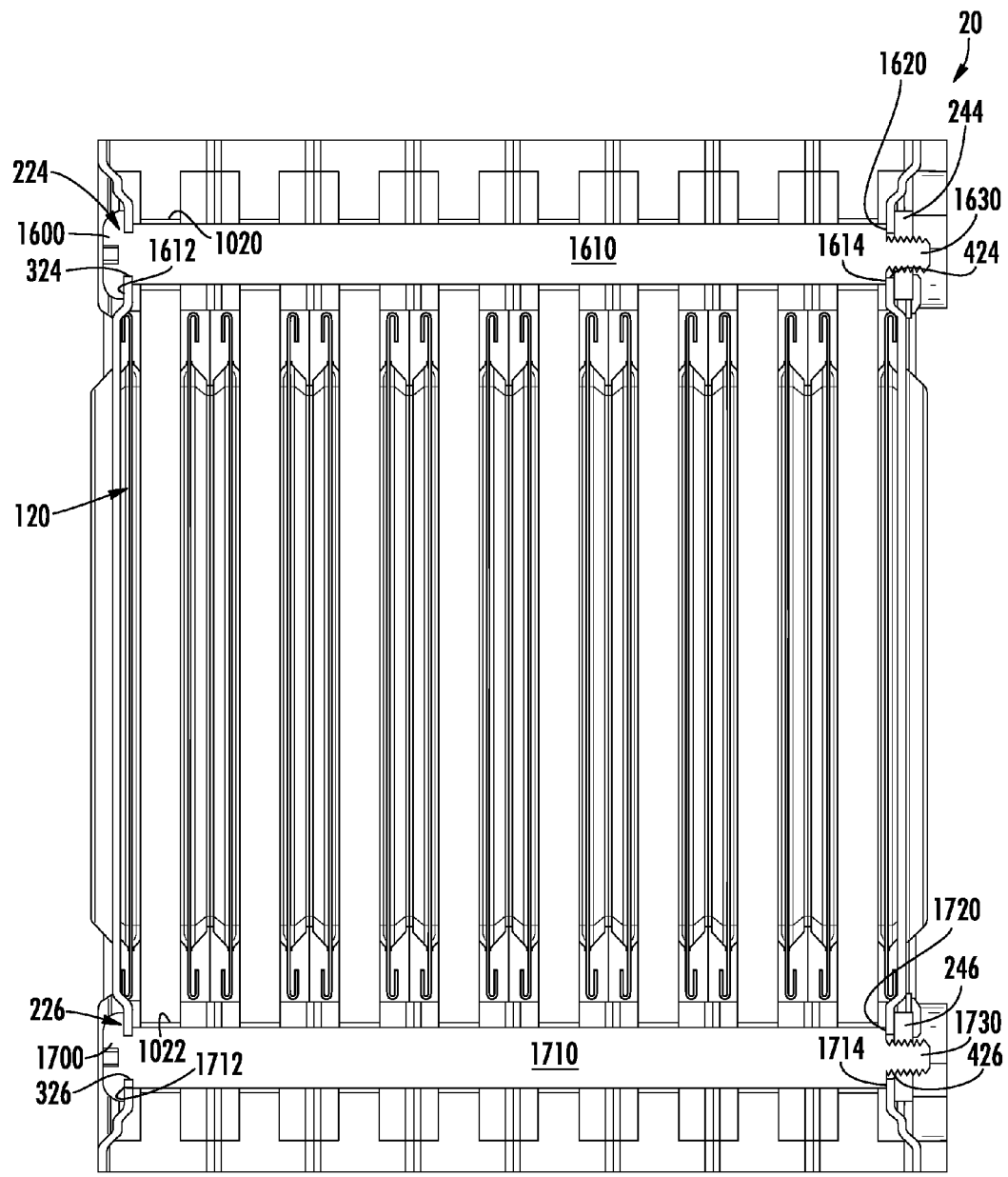
FIG. 9 is another cross-sectional schematic of the battery module of FIG. 1.
Figure 10:
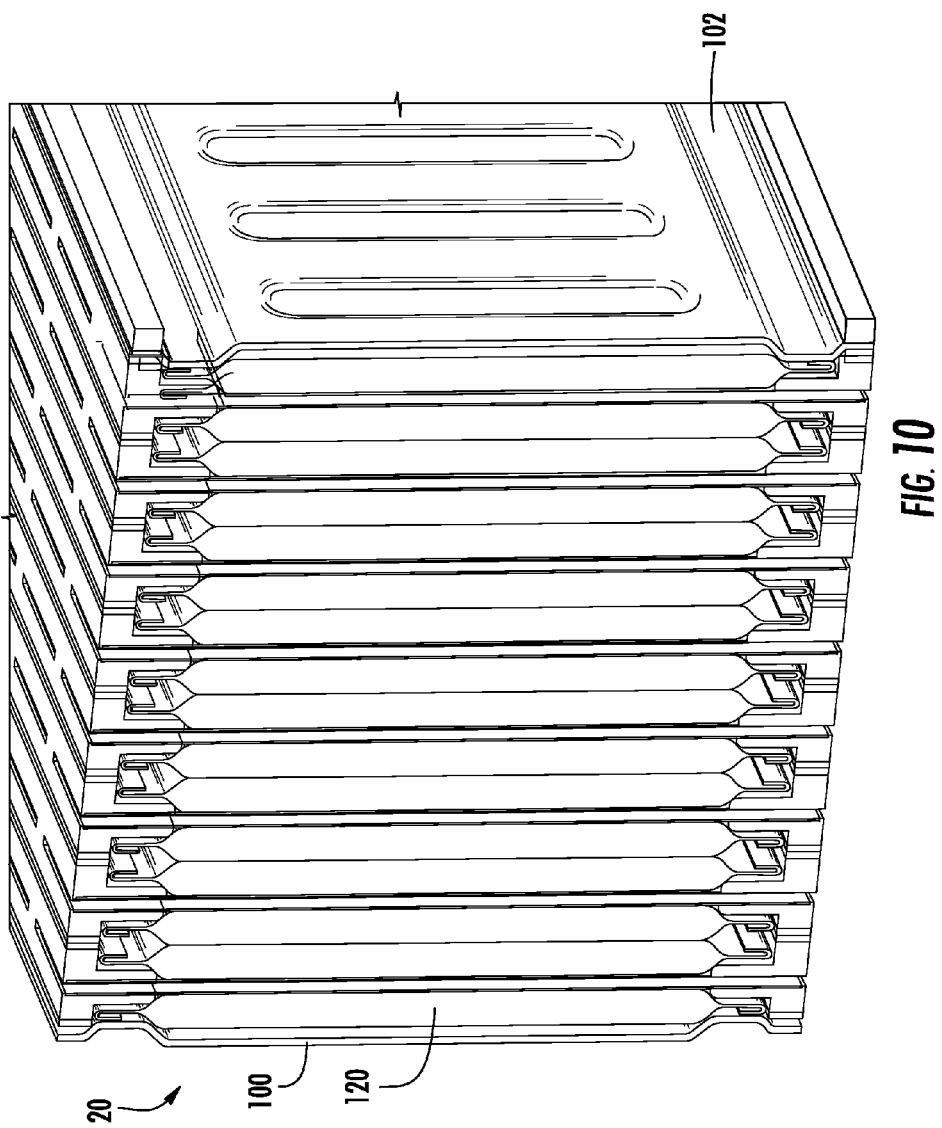
FIG. 10 is another cross-sectional schematic of the battery module of FIG. 1.
Figure 11:
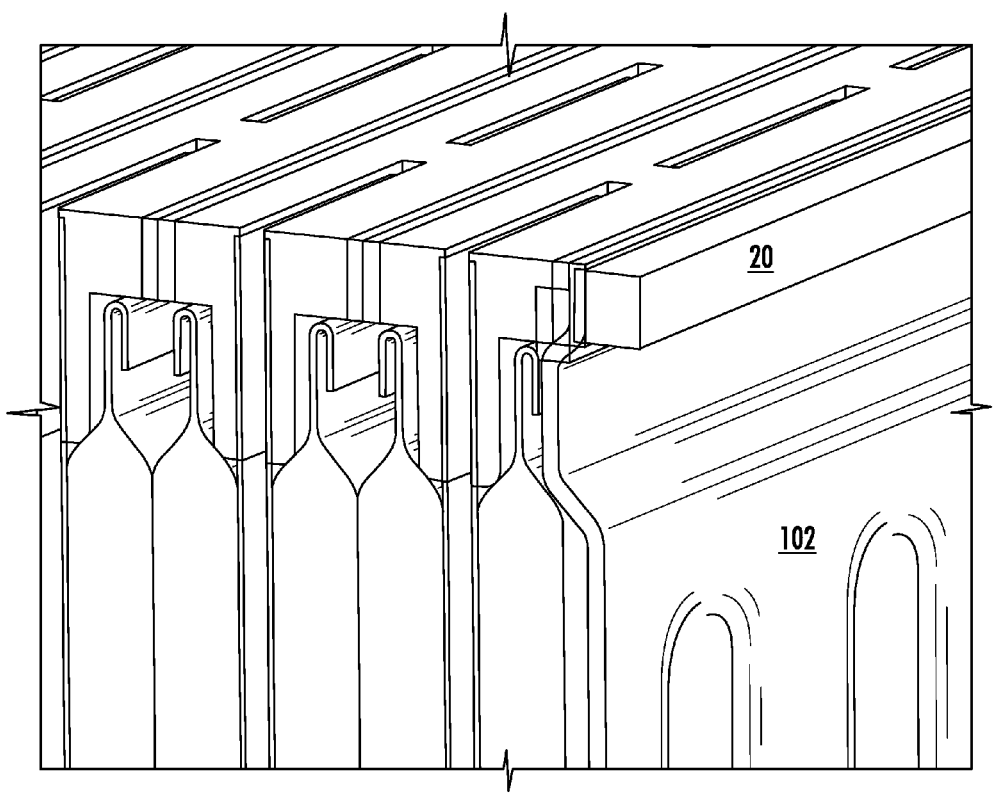
FIG. 11 is an enlarged cross-sectional schematic of a portion of the battery module of FIG. 1.
Figure 12:
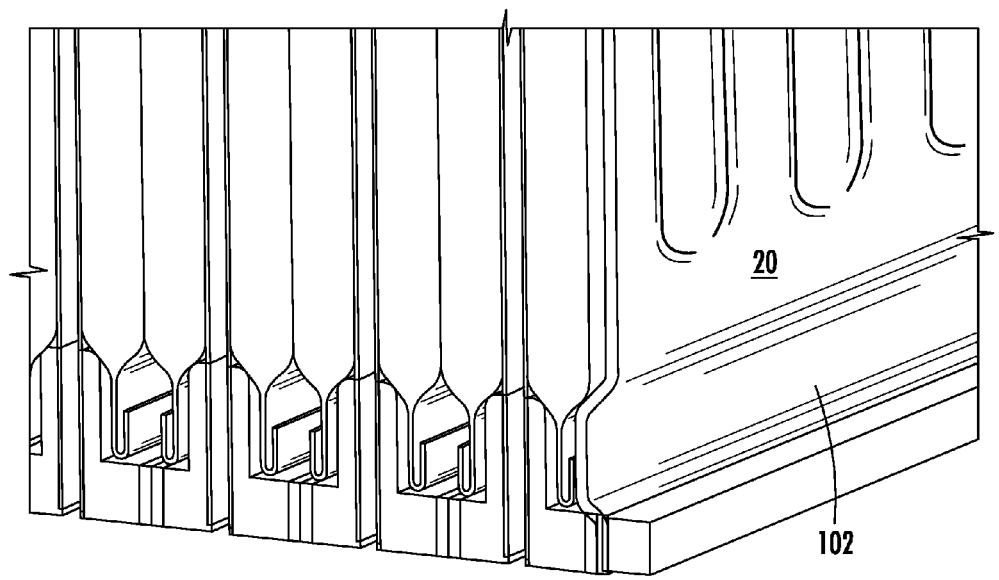
FIG. 12 is another enlarged cross-sectional schematic of a portion of the battery module of FIG. 1.
Figure 13:
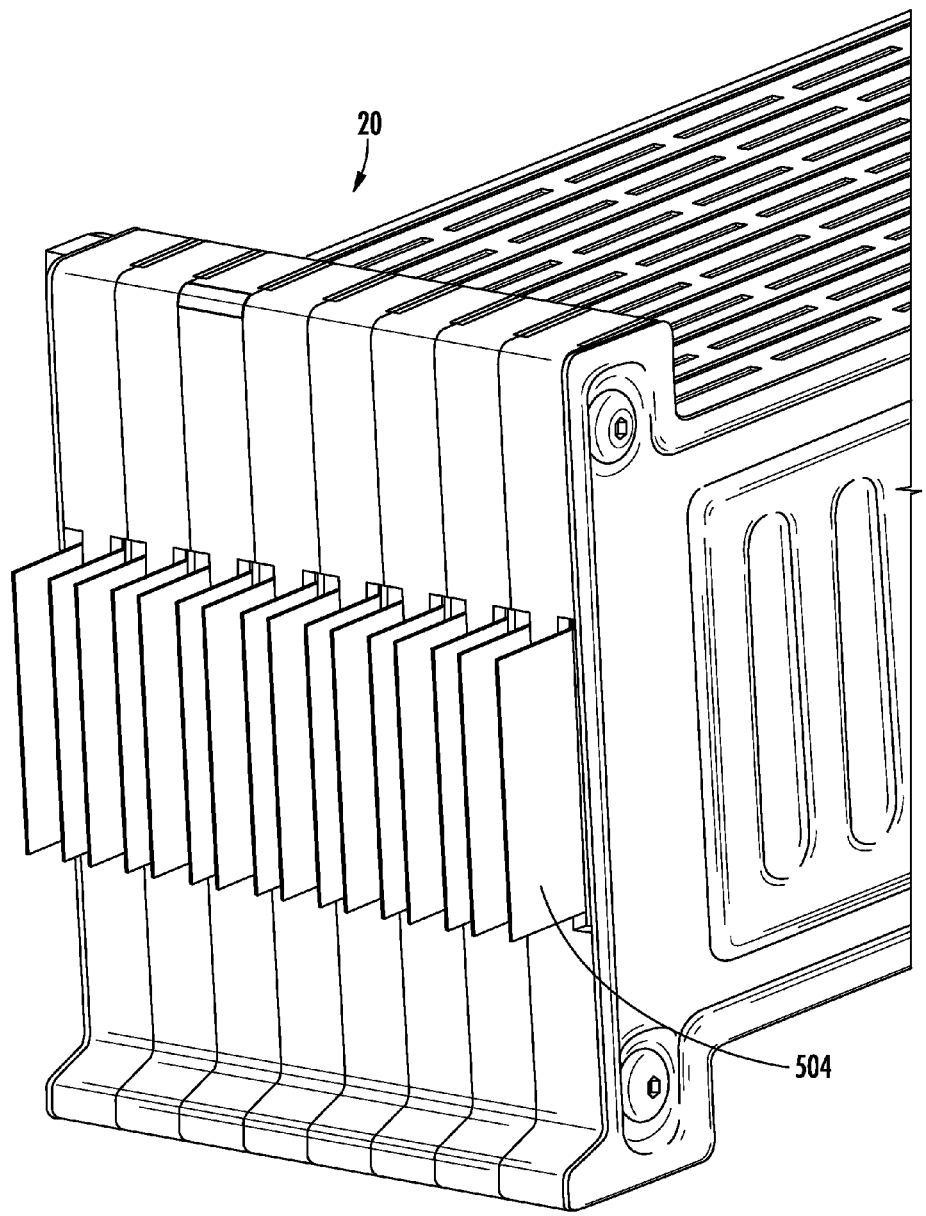
FIG. 13 is a schematic of a portion of the battery module of FIG. 1 illustrating electrical terminals extending therefrom.

Referring to FIGS. 7 and 9, the end plates 100, 102 are provided to hold the remaining components of the battery module 20 therebetween. In one exemplary embodiment, the end plates 100, 102 are constructed of steel. The end plate 100 includes apertures 320, 322, 324, 326 extending therethrough for receiving portions of shoulder bolts therethrough. The end plate 102 includes apertures 420, 422, 424, 426 extending therethrough for receiving portions of shoulder bolts therethrough.

Referring to FIGS. 7, 13, 25 and 26, the battery cells 120-150 have a substantially similar structure. Thus, only the structure of the battery cell 120 will be described in greater detail below. In one exemplary embodiment, the battery cells 120-150 are electrically coupled in series to one another. Further, in one exemplary embodiment, the battery cells 120-150 are lithium-ion battery cells. Of course, in alternative embodiments, the battery cells 120-150 could be other types of battery cells known to those skilled in the art. The battery cell 120 includes a body portion 502 and electrical terminals 504, 506 extending from opposite ends of the body portion 502.

Referring to FIGS. 4-6 and 14, the frame members 180-194 are provided to hold the battery cells therebetween and to allow air to flow through the frame members 180-194 to cool the battery cells.

The frame member 180 is disposed between the end plate 100 and the frame member 182. The battery cell 120 is disposed between the frame member 180 and the end plate 100. Also, the battery cells 122, 124 are disposed between the frame members 180, 182 and the body portions of the battery cells 122, 124 are surrounded by the frame members 180, 182.

The frame member 182 is disposed between the frame member 180 and the frame member 184. The battery cells 126, 128 are disposed between the frame members 182, 184 and the body portions of the battery cells 126, 128 are surrounded by the frame members 182, 184.

The frame member 184 is disposed between the frame member 182 and the frame member 186. The battery cells 130, 132 are disposed between the frame members 184, 186 and the body portions of the battery cells 130, 132 are surrounded by the frame members 184, 186.

The frame member 186 is disposed between the frame member 184 and the frame member 188. The battery cells 134, 136 are disposed between the frame members 186, 188 and the body portions of the battery cells 134, 136 are surrounded by the frame members 186, 188.

The frame member 188 is disposed between the frame member 186 and the frame member 190. The battery cells 138, 140 are disposed between the frame members 188, 190 and the body portions of the battery cells 138, 140 are surrounded by the frame members 188, 190.

The frame member 190 is disposed between the frame member 188 and the frame member 192. The battery cells 142, 144 are disposed between the frame members 190, 192 and the body portions of the battery cells 142, 144 are surrounded by the frame members 190, 192.

The frame member 192 is disposed between the frame member 190 and the frame member 194. The battery cells 146, 148 are disposed between the frame members 192, 194 and the body portions of the battery cells 146, 148 are surrounded by the frame members 192, 194.

The frame member 194 is disposed between the frame member 192 and the end plate 102. The battery cell 150 is disposed between the frame member 194 and the end plate 102 and the body portion of the battery cell 150 is surrounded by the frame member 194 and the end plate 102.

The frame members 180-194 have an identical structure and only the structure of the frame member 180 will be described in greater detail below. Referring to FIGS. 5, 6 and 14-17, the frame member 180 includes first and second sides 600, 605, first, second, third, and fourth peripheral walls 610, 620, 630, 640, first and second thermally conductive plates 650, 660, and first and second elastomeric sealing members 670, 680. In one exemplary embodiment, the first, second, third and fourth peripheral walls 610, 620, 630, 640 define a substantially rectangular ring-shaped frame and are centered symmetrically about a plane 641 extending through the walls 610, 620, 630, 640. The first and second peripheral walls 610, 620 are substantially parallel to one another and are disposed between and coupled to the third and fourth peripheral walls 630, 640. The third and fourth peripheral wall 630, 640 are substantially parallel to one another and are substantially perpendicular to the first and second peripheral walls 610, 620. The first, second, third and fourth peripheral walls 610, 620, 630, 640 define an open interior region 642 (shown in FIG. 16) therebetween. In one exemplary embodiment, the first, second, third, and fourth peripheral walls 610, 620, 630, 640 are constructed of plastic.

The first peripheral wall 610 includes a plurality of apertures 710 extending therethrough. The plurality of apertures 710 include apertures 712, 714, 716, 718, 720, 722, 724. The plurality of apertures 710 are configured to receive air flowing therethrough for cooling battery cells.

The second peripheral wall 620 includes a plurality of apertures 810 extending therethrough. The plurality of apertures 810 include apertures 812, 814, 816, 818, 820, 822, 824. The plurality of apertures 810 are configured to receive air flowing therethrough for cooling battery cells.

The third peripheral wall 630 includes an outlet 830 (e.g., a groove) extending into the first side 600, and an outlet 832 (e.g., a groove) extending into the second side 605. Alternatively, the outlets 830, 832, could be apertures extending through the third peripheral wall 630. The outlets 830, 832 are configured to receive an electrical terminal 504 and another electrical terminal, respectively, of the battery cells 120, 122 therethrough. Further, the outlets 830, 832 are configured to route any gases from the battery cells 120, 122 past the associated electrical terminals to outside of the frame member 180 if the battery cells 120, 122 output gases therefrom. The third peripheral wall 630 further includes peripheral corner regions 840, 842 having apertures 920, 922 respectively, extending therethrough. The apertures 920, 922 are configured to receive portions of the shoulder bolts 220, 222, respectively, therethrough.

The fourth peripheral wall 640 includes an outlet 1030 (e.g., a groove) extending into the first side 600, and an outlet 1032 (e.g., a groove) extending into the second side 605. Alternatively, the outlets 1030, 1032, could be apertures extending through the fourth peripheral wall 640. The outlets 1030, 1032 are configured to receive an electrical terminal 506 and another electrical terminal, respectively, of the battery cells 120, 122 therethrough. Further, the outlets 1030, 1032 are configured to route any gases from the battery cells 120, 122 past the associated electrical terminals to outside of the frame member 180 if the battery cells 120, 122 output gases therefrom. The fourth peripheral wall 640 further includes peripheral corner regions 1040, 1042 having apertures 1020, 1022 respectively, extending therethrough. The apertures 1020, 1022 are configured to receive portions of the shoulder bolts 224, 226, respectively, therethrough.

Referring to FIGS. 4 and 18-21, the first and second thermally conductive plates 650, 660 are configured to conduct heat energy away from adjacent battery cells into air flowing between the plates 650, 660. In one exemplary embodiment, the first and second thermally conductive plates 650, 660 are constructed of steel and have corrugated cross-sectional profiles which define a plurality of flow channels therebetween. Of course, in alternative embodiments, other thermally conductive materials known to those skilled in the art could be utilized to construct the plates 650, 660. The first and second thermally conductive plates 650, 660 are fixedly coupled together via weld joints. In one exemplary embodiment, the first, second, third, and fourth peripheral walls 610, 620, 630, 640 are injected-molded around portions of the first and second thermally conductive plates 650, 660.

The first thermally conductive plate 650 is coupled to the first, second, third and fourth peripheral walls 610, 620, 630, 640 to enclose the open interior region 642 proximate to the first side 600 of the frame member 180. The first thermally conductive plate 650 is disposed against the battery cell 120. An area of a side of the first thermally conductive plate 650 is substantially equal to an area of a side of a body portion of the battery cell 120 adjacent to the first thermally conductive plate 650. The first thermally conductive plate 650 includes tread portions 1050, 1052, 1054, 1056, 1058, 1060, 1062, 1064 and ridge portions 1070, 1072, 1074, 1076, 1078, 1080, 1082, 1084.

The second thermally conductive plate 660 is coupled to the first, second, third and fourth peripheral walls 610, 620, 630, 640 to enclose the open interior region 642 proximate to the second side 605 of the frame member 180. The second thermally conductive plate 660 is disposed against the battery cell 122. An area of a side of the second thermally conductive plate 660 is substantially equal to an area of a side of a body portion of the battery cell 122 adjacent to the second thermally conductive plate 660. The second thermally conductive plate 660 includes tread portions 1150, 1152, 1154, 1156, 1158, 1160, 1162, 1164 and ridge portions 1170, 1172, 1174, 1176, 1178, 1180, 1182, 1184. The tread portions 1150, 1152, 1154, 1156, 1158, 1160, 1162, 1164 of the second thermally conductive plate 660 are disposed against the tread portions 1050, 1052, 1054, 1056, 1058, 1060, 1062, 1064, respectively, of the first thermally conductive plate 650.

The ridge portions 1170, 1172, 1174, 1176, 1178, 1180, 1182, 1184 of the second thermally conductive plate 660 are disposed opposite to the ridge portions 1070, 1072, 1074, 1076, 1078, 1080, 1082, 1084, respectively, of the first thermally conductive plate 650, to form flow channels 1270, 1272, 1274, 1276, 1278, 1280, 1282, respectfully therebetween. The plurality of flow channels 1270-1282 comprise a plurality of flow channels 1190.

Referring to FIGS. 5, 6, 11, 12 and 20, the apertures 712, 714, 716, 718, 720, 722, 724 in the first peripheral wall 610 of the frame member 180 fluidly communicate with a first end of the flow channels 1270, 1272, 1274, 1276, 1278, 1280, 1282, respectively. Further, the apertures 812, 714, 816, 818, 820, 822, 824 in the second peripheral wall 620 of the frame member 180 fluidly communicate with a second end of the flow channels 1270, 1272, 1274, 1276, 1278, 1280, 1282, respectively. During operation, air flows through the apertures 712, 714, 716, 718, 720, 722, 724 and through the flow channels 1270, 1272, 1274, 1276, 1278, 1280, 1282, respectively and further through the apertures 812, 714, 816, 818, 820, 822, 824, respectively, to extract energy from battery cells 120, 122 adjacent to the first and second thermally conductive plates 650, 660, respectively.

Figure 4:
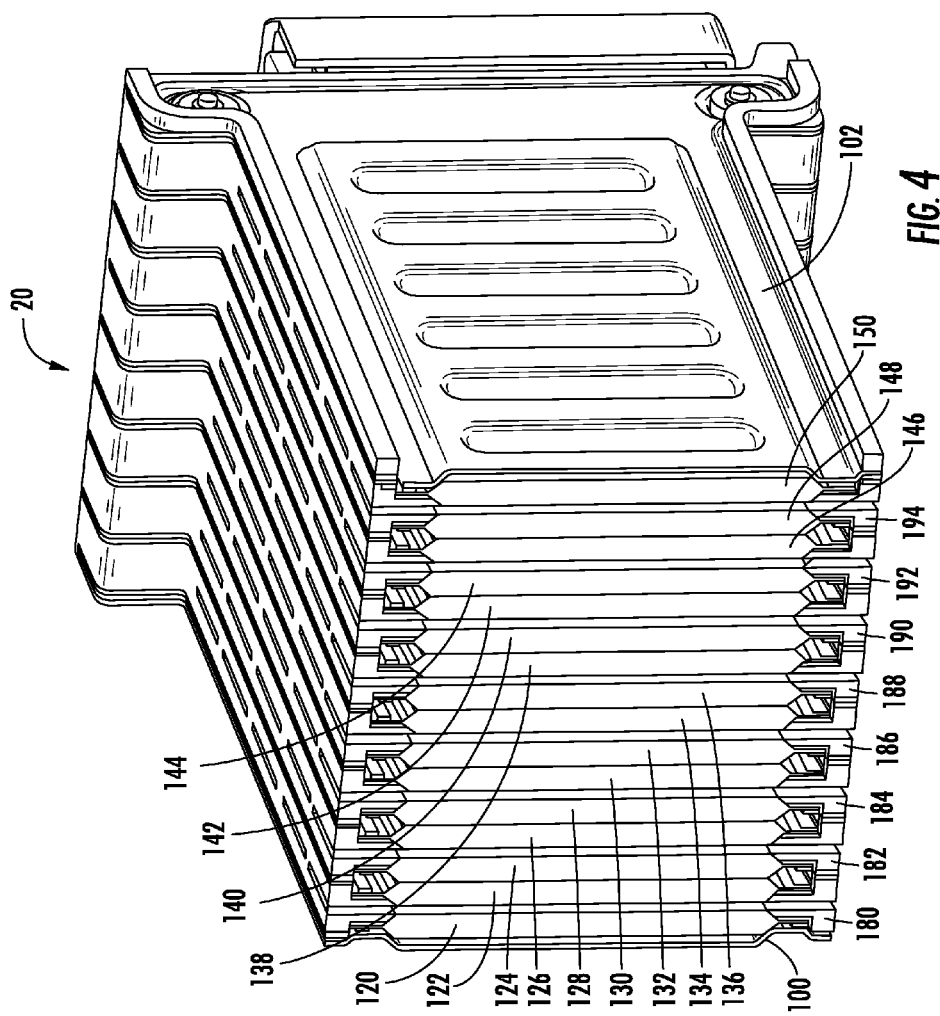
FIG. 4 is a cross-sectional schematic of the battery module of FIG. 1.
Figure 5:
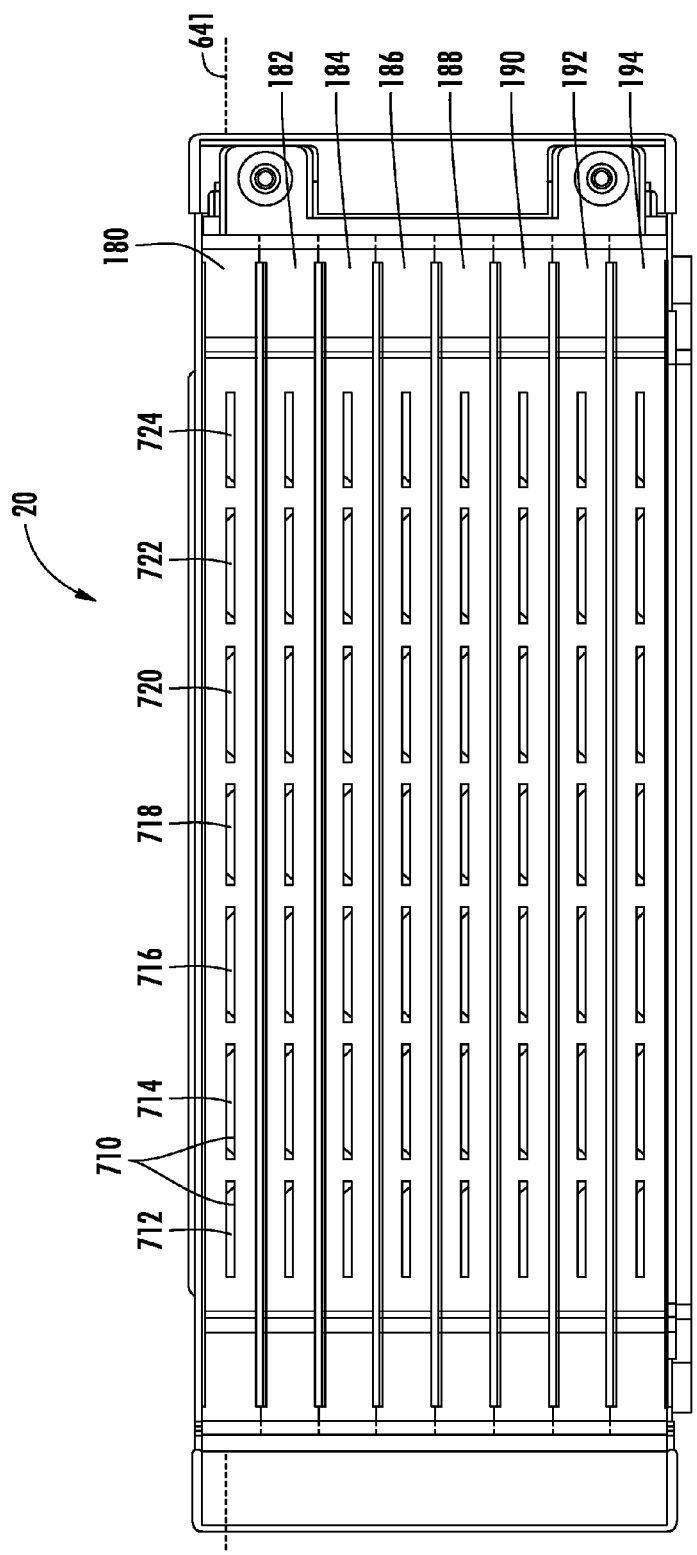
FIG. 5 is a schematic illustrating a top view of the battery module of FIG. 1.
Figure 6:
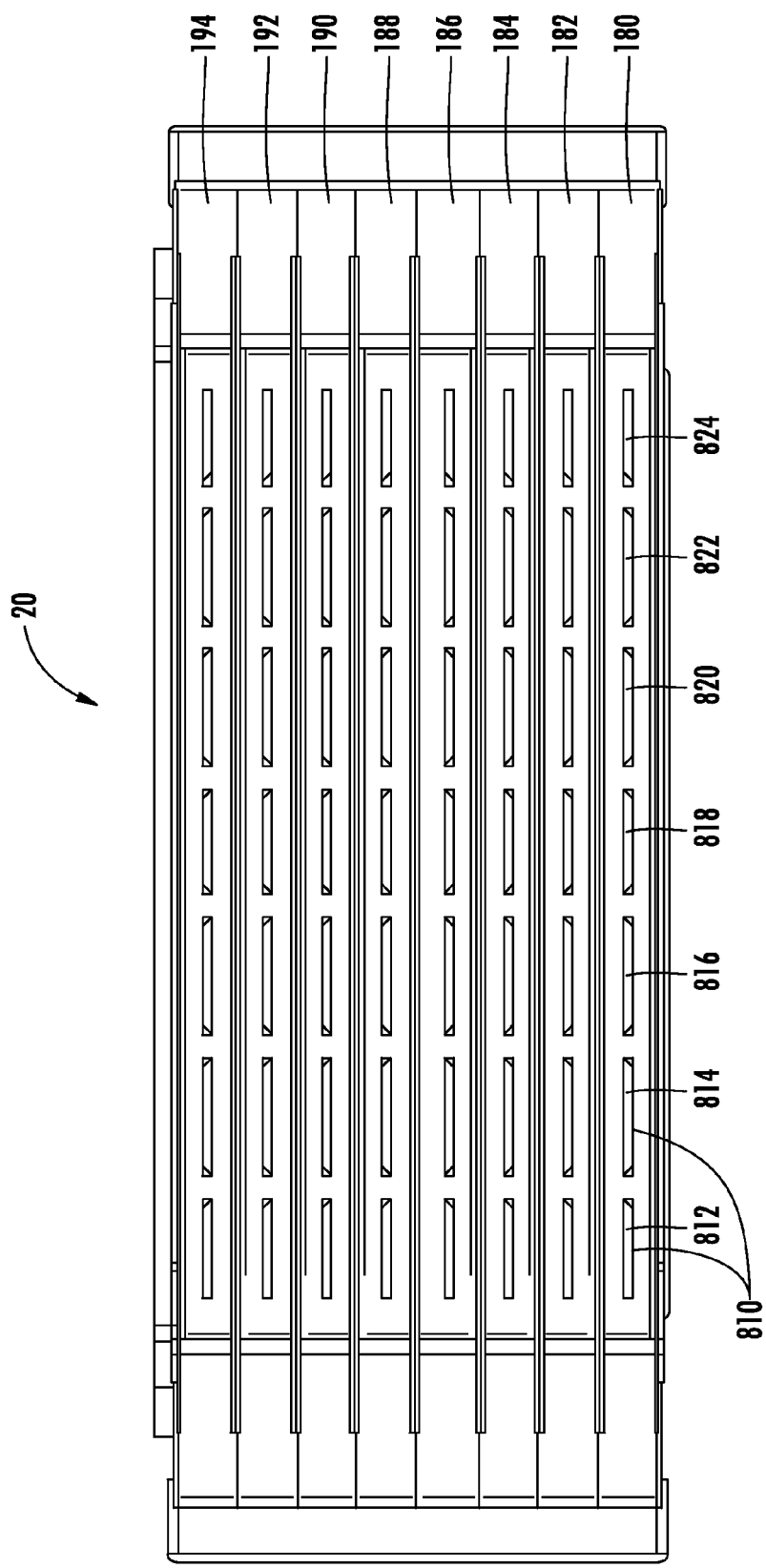
FIG. 6 is a schematic illustrating a bottom view of the battery module of FIG. 1.
Figure 14:
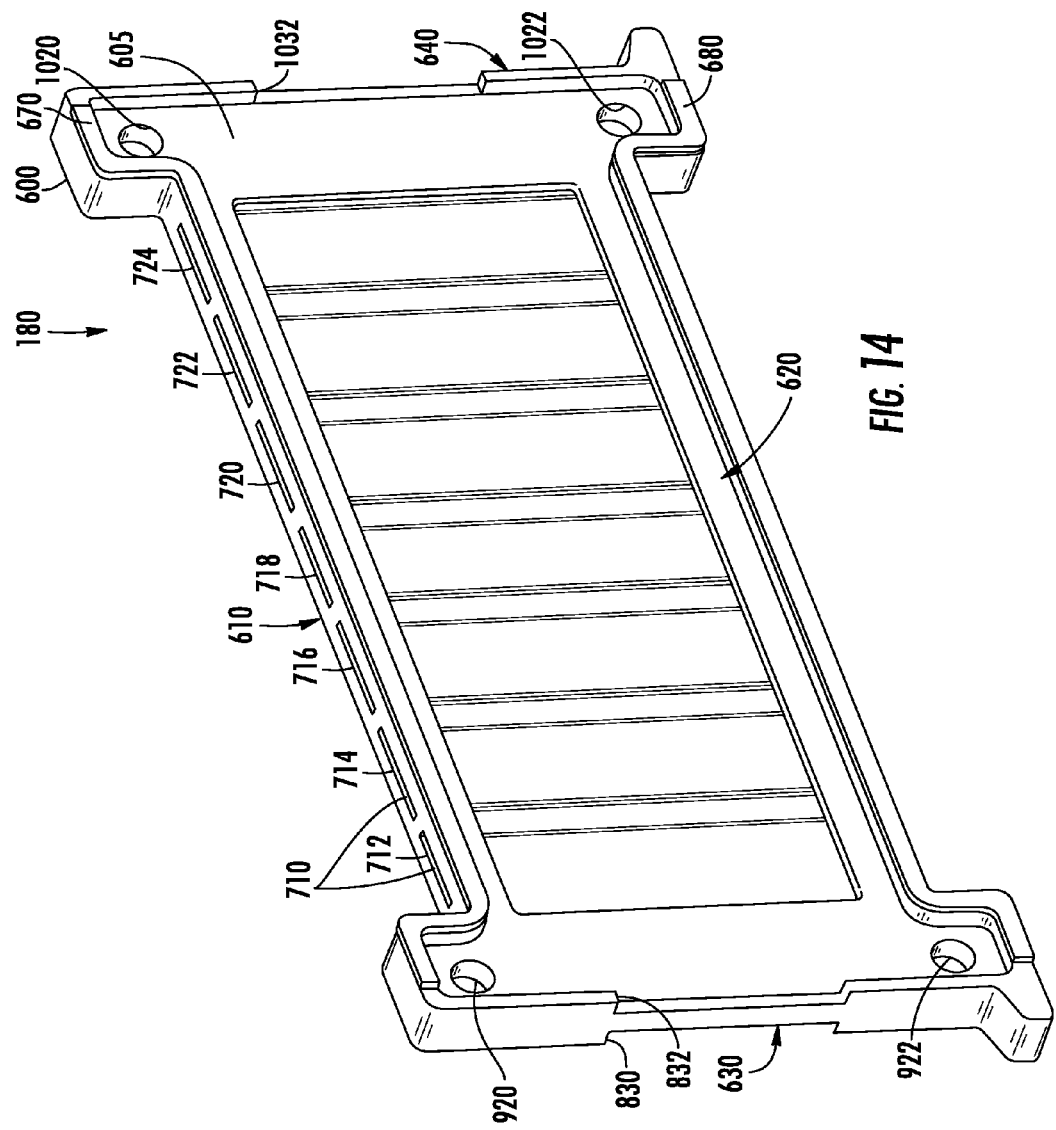
FIG. 14 is a schematic of a frame member utilized in the battery module of FIG. 1.
Figure 15:
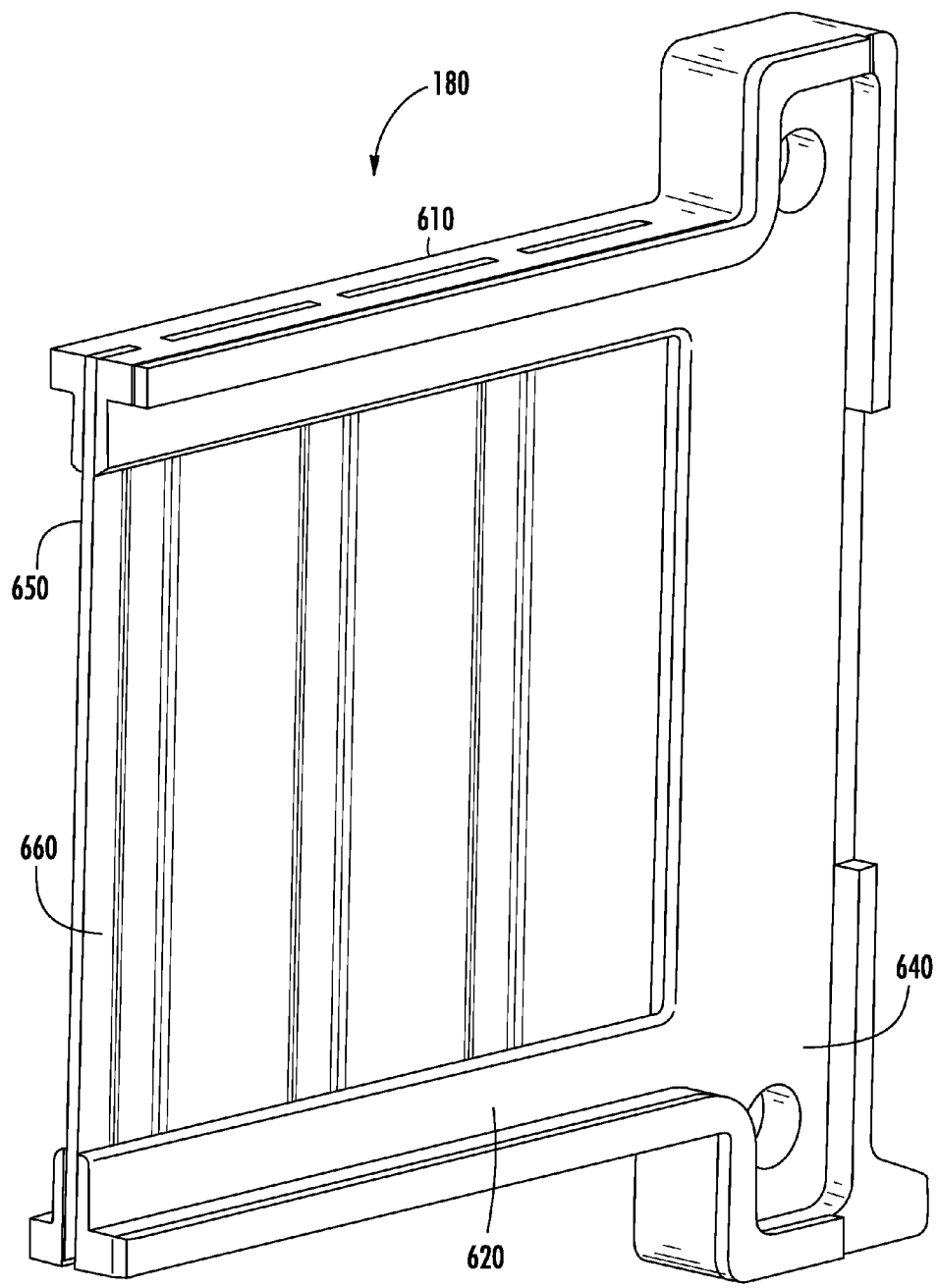
FIG. 15 is a cross-sectional schematic of the frame member of FIG. 14.
Figure 16:
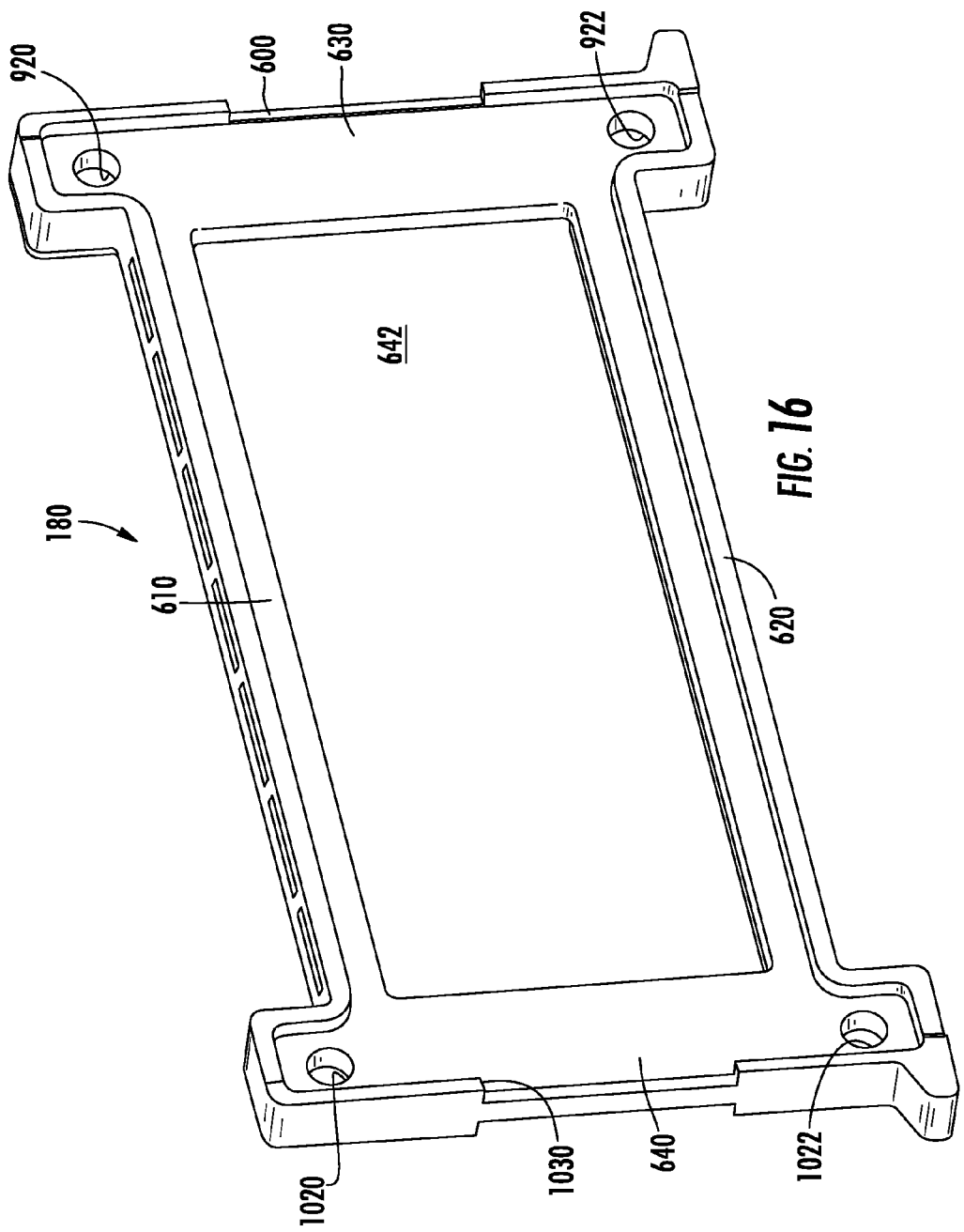
FIG. 16 is a schematic of a portion of the frame member of FIG. 14.
Figure 17:
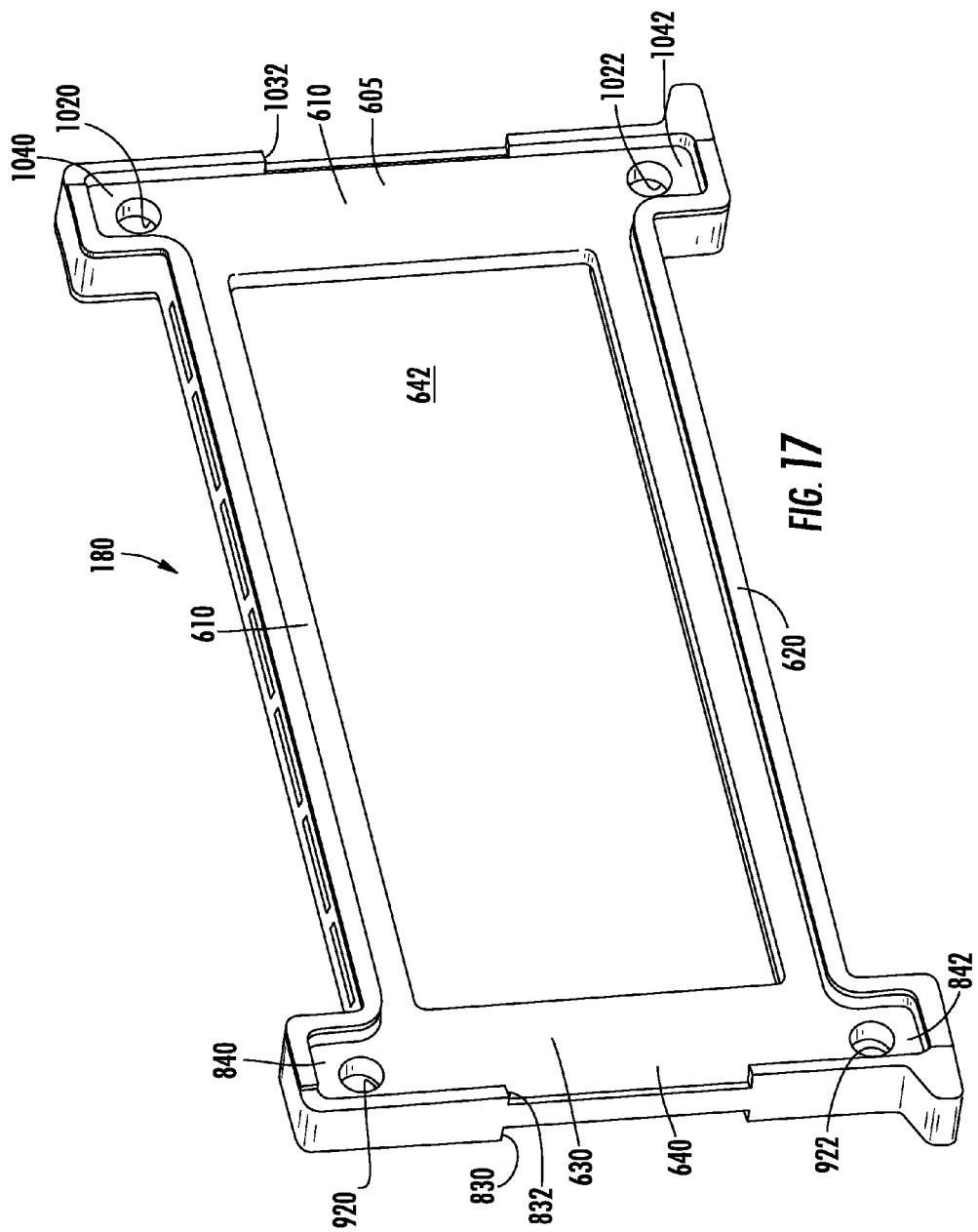
FIG. 17 is another schematic of a portion of the frame member of FIG. 14.
Figure 18:
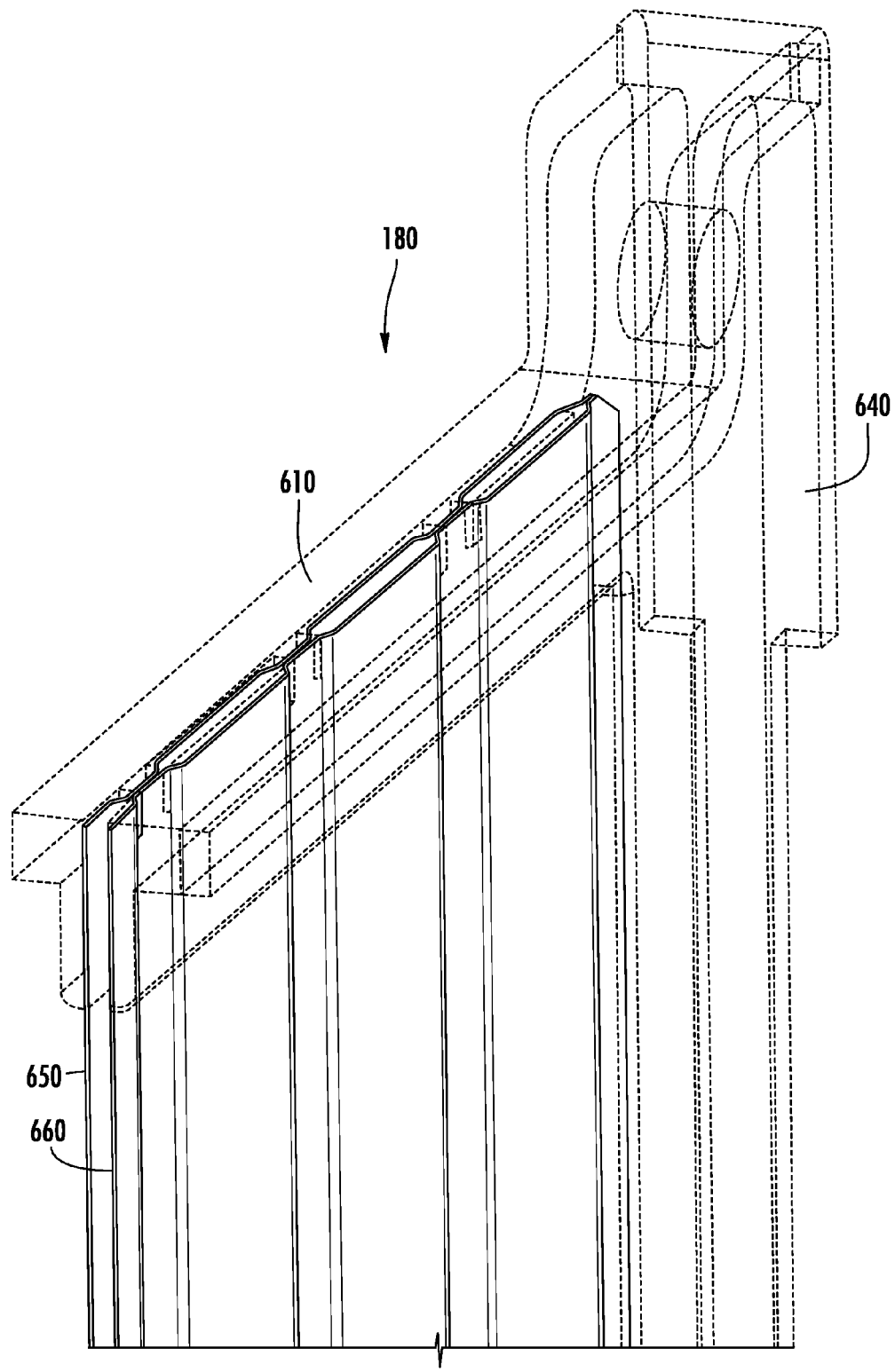
FIG. 18 is a cross-sectional schematic of a portion of the frame member of FIG. 14.
Figure 19:
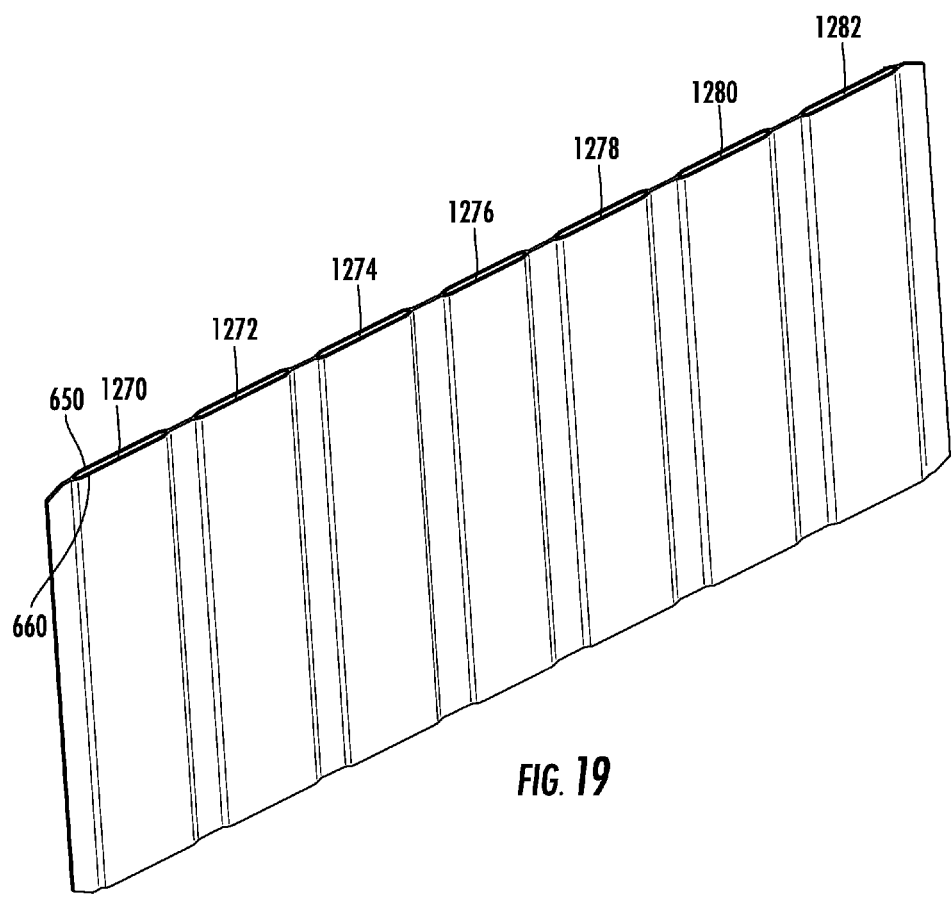
FIG. 19 is a schematic of the first and second thermally conductive plates utilized to form flow channels in the frame member of FIG. 14.
Figure 20:
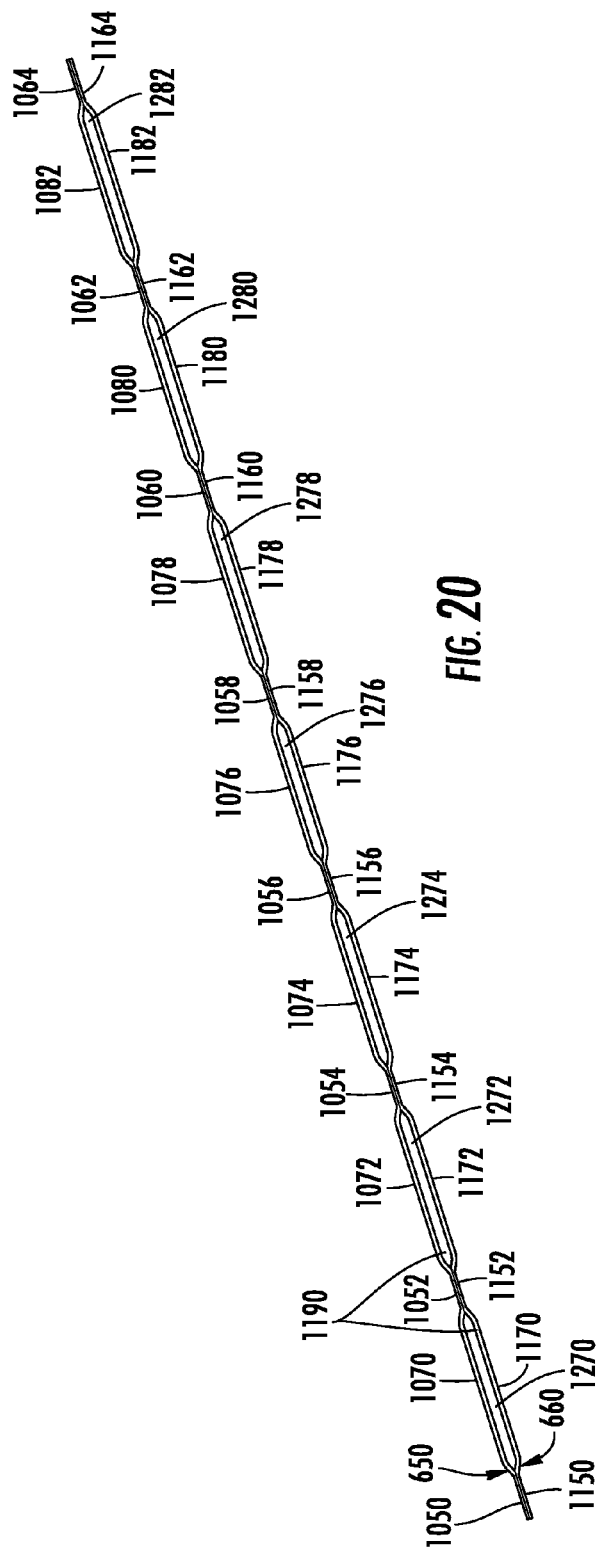
FIG. 20 is a cross-sectional schematic of the first and second thermally conductive plates of FIG. 19.
Figure 21:
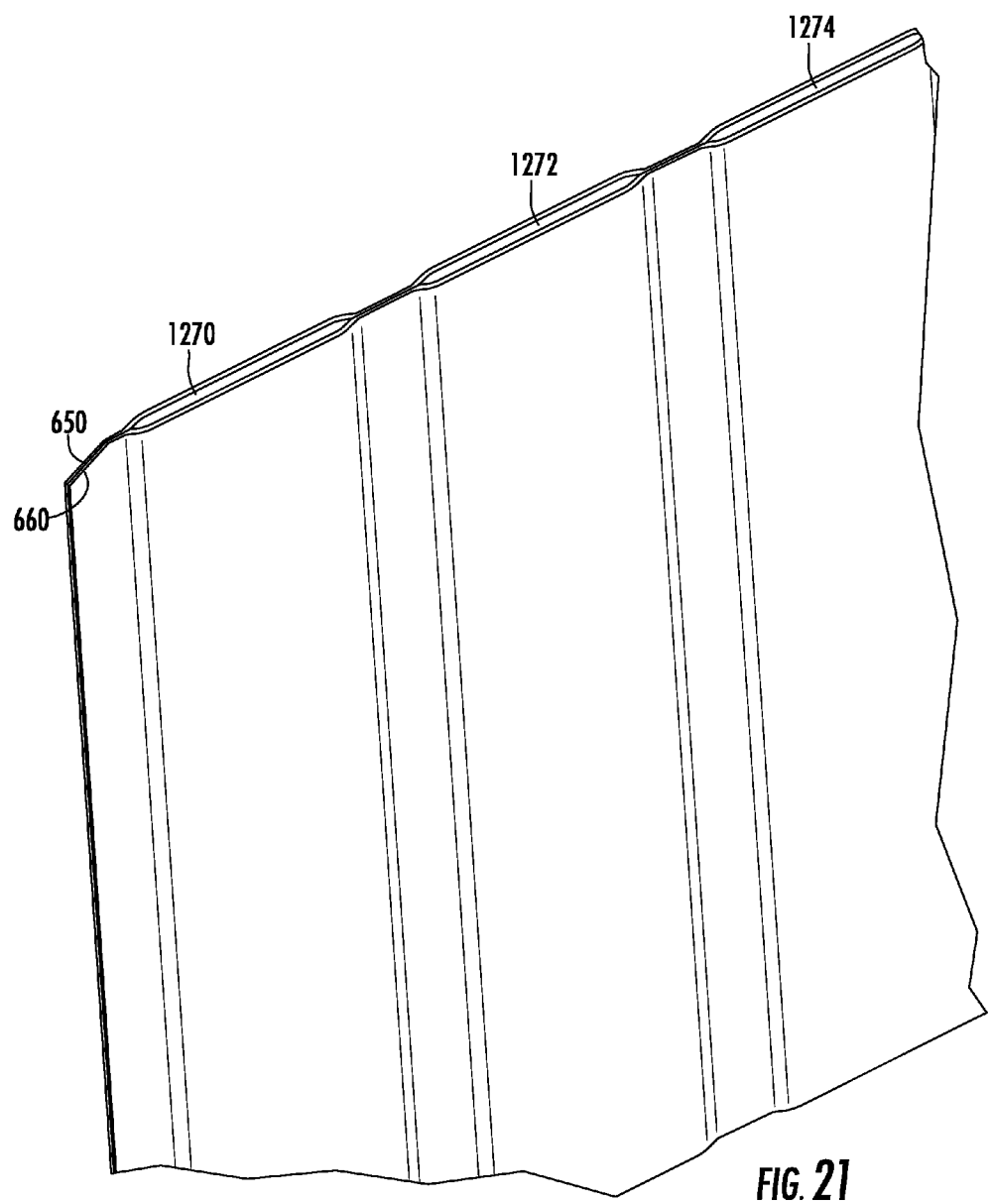
FIG. 21 is an enlarged cross-sectional schematic of a portion of the first and second thermally conductive plates of FIG. 19.
Figure 22:
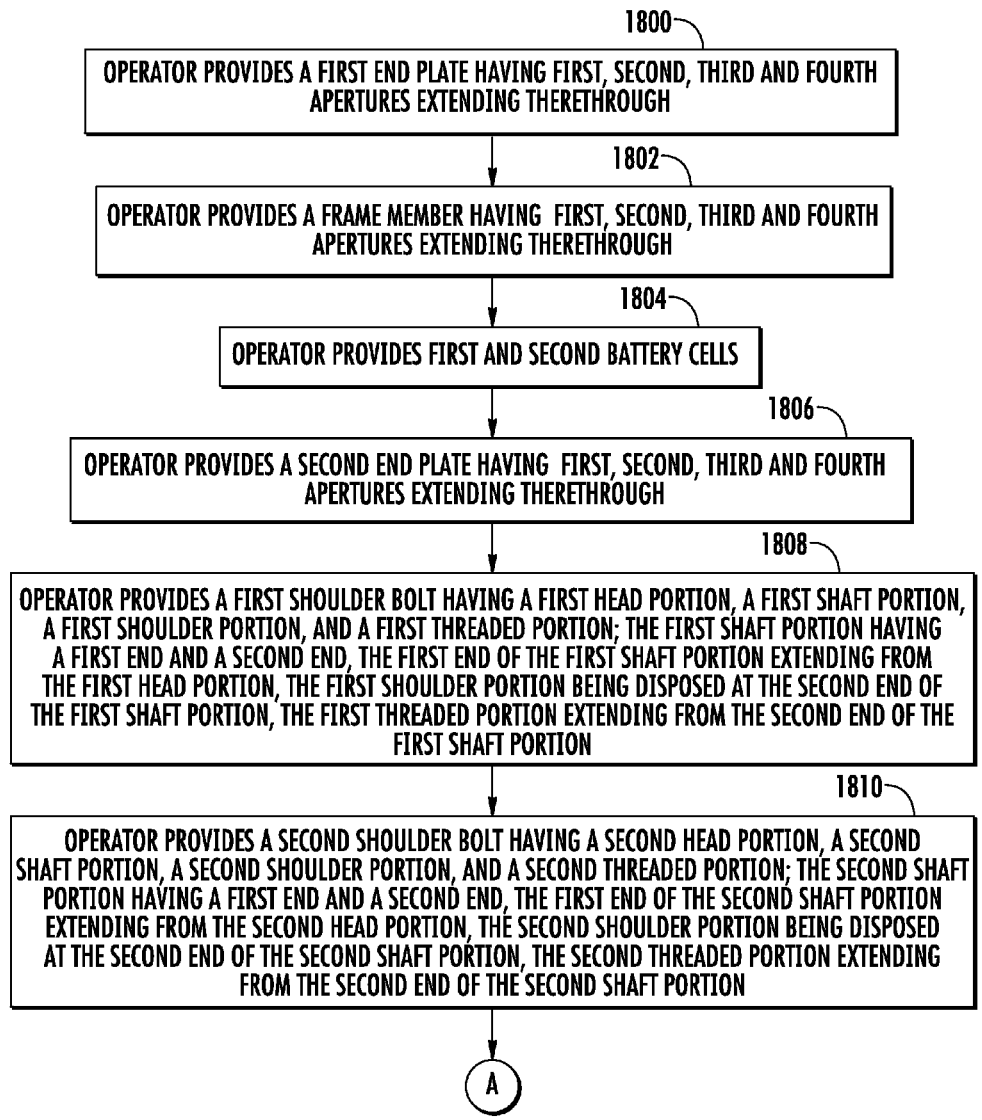
FIGS. 22-24 are flowcharts a method for assembling the battery module of FIG. 1 in accordance with another exemplary embodiment.
Figure 23:
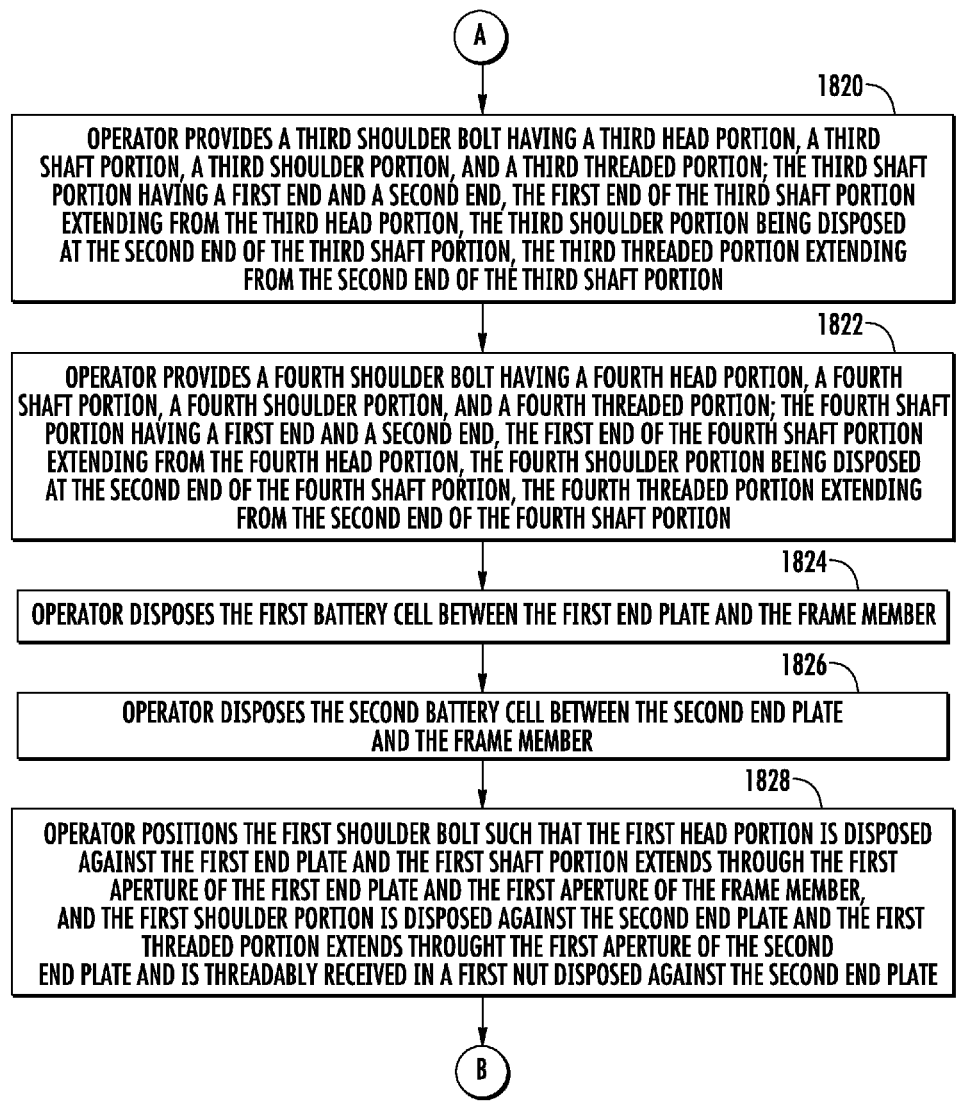
Figure 24:
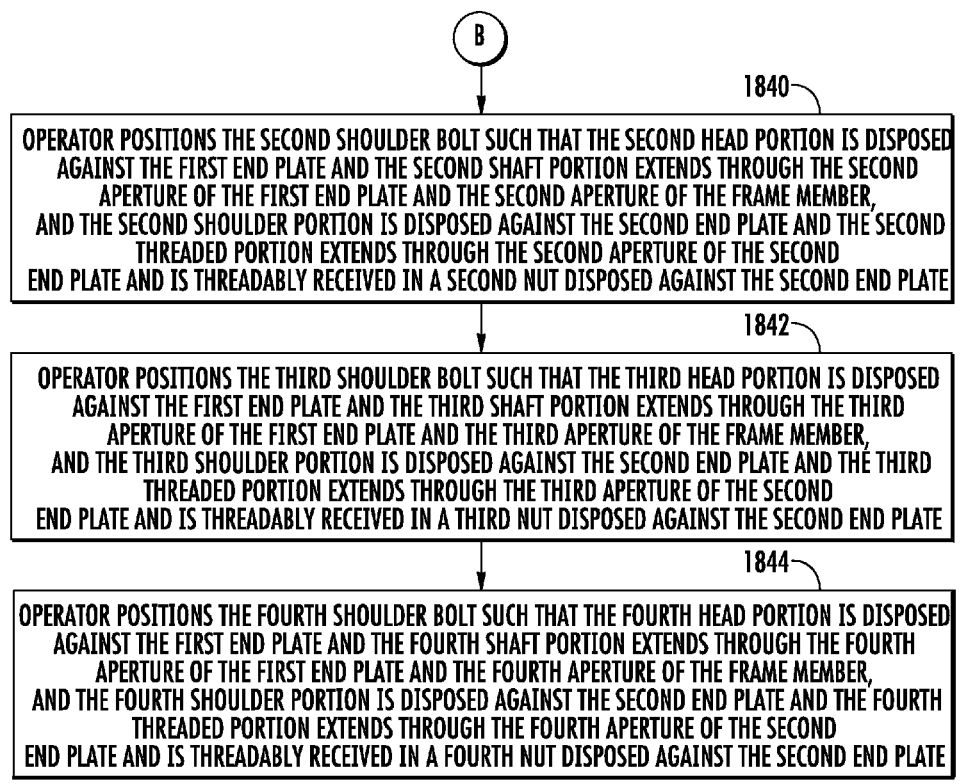
Figure 25:
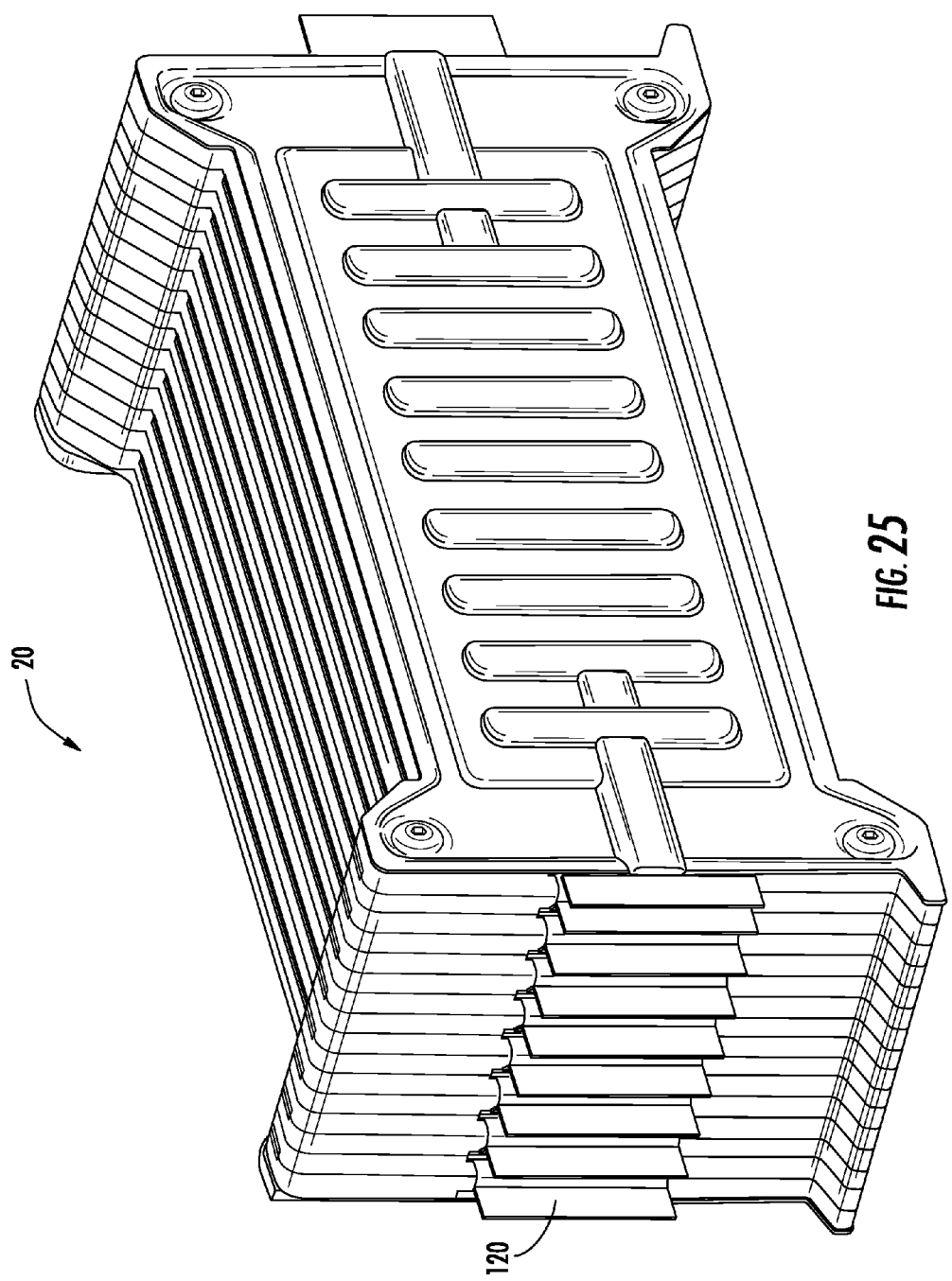
FIG. 25 is another schematic of the battery module of FIG. 1 having electrical terminals.
Figure 26:
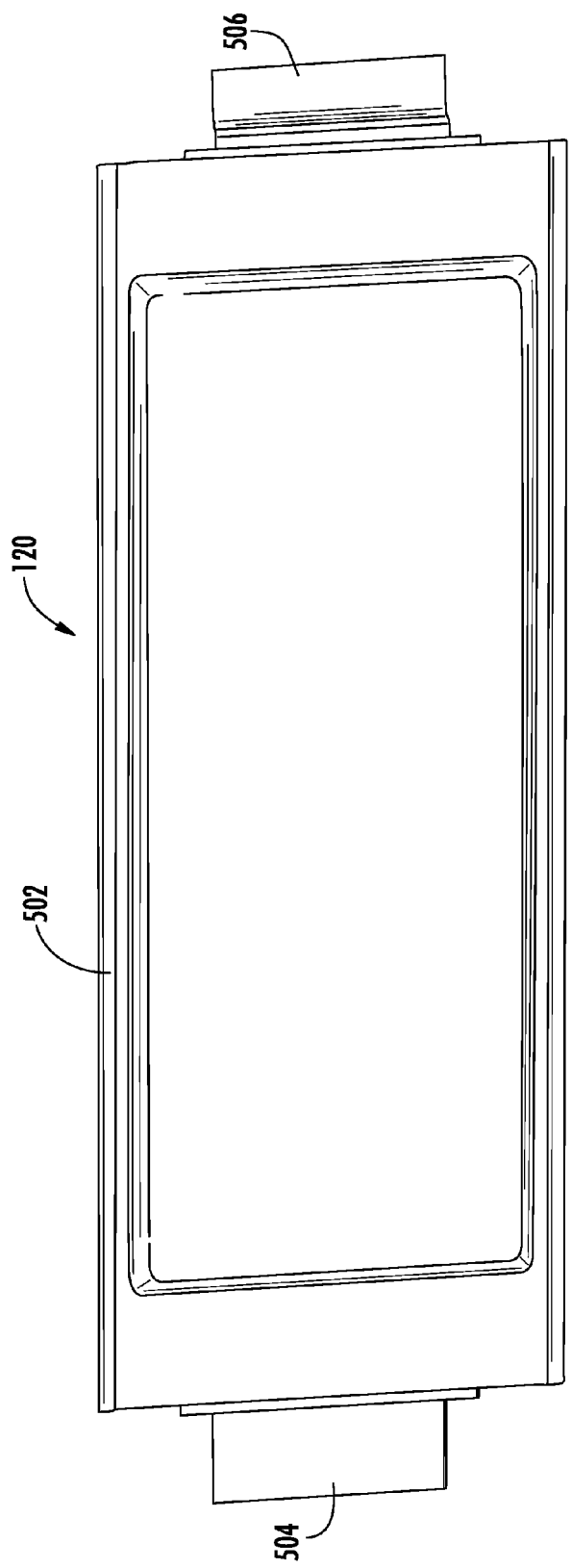
FIG. 26 is a schematic of a battery cell utilized in the battery module of FIG. 1.

Referring to FIGS. 4 and 14, the frame member 180 includes first and second elastomeric sealing members 670, 680 disposed on the first and second peripheral walls 610, 620, respectively. The first and second elastomeric sealing members 670, 680 direct any gases output by the battery cells 122, 124 to be directed toward the outlets 832, 1032 which then exit the outlets 832, 1032 to outside of the frame member 180 and the battery module 20. Thus, a flow path of any gases output by the battery cells is isolated and separate from the plurality of flow paths 1190 through the first and second thermally conductive plates 650, 660.

Figure 2:
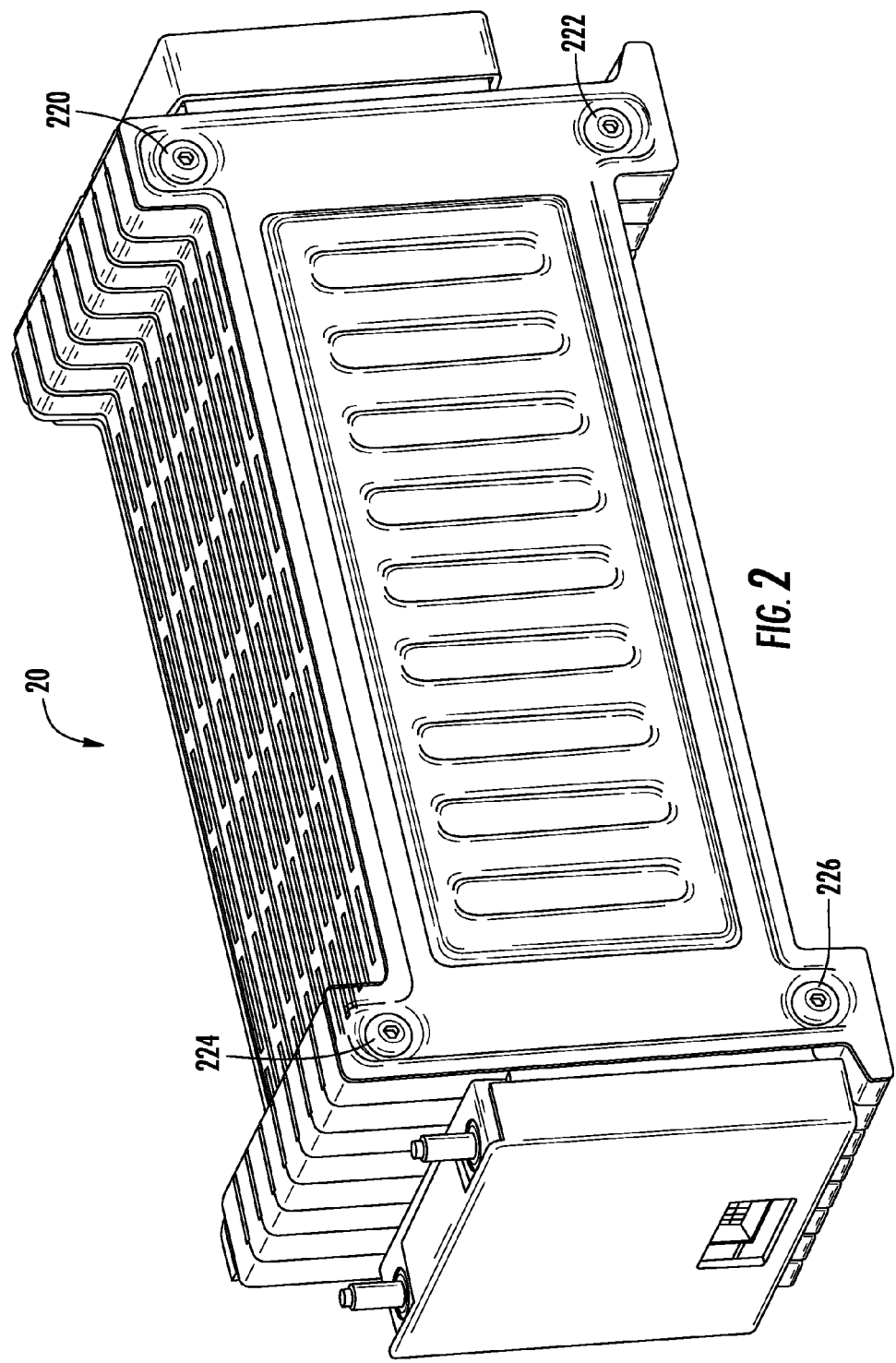
FIG. 2 is another schematic of the battery module of FIG. 1.

Referring to FIGS. 2, 7 and 9, the first, second, third, and fourth shoulder bolts 220, 222, 224, 226 are provided to couple the end plate 100, the frame members 180-194, and the end plate 102 together. Also, a length of a shaft portion of each of shoulder bolts sets a distance between the end plates 100, 102 and thus a longitudinal force applied to each of the frame members 180-194.

The first shoulder bolt 220 includes a head portion 1400, a shaft portion 1410, a shoulder portion 1420, and a threaded portion 1430. The shaft portion 1410 has a first end 1412 and a second end 1414. The first end 1412 extends from the head portion 1400. The shoulder portion 1420 is disposed at the second end 1414 of the shaft portion 1410. The threaded portion 1430 extends from the second end 1414 of the shaft portion 1410.

The first shoulder bolt 220 is disposed such that the head portion 1400 is disposed against the first end plate 100 and the shaft portion 1410 extends through the aperture 320 of the first end plate 100 and the aperture 920 of the frame member 180 and each respective adjacent aperture in the frame members 182-194, and the shoulder portion 1420 is disposed against the second end plate 102 and the threaded portion 1430 extends through the aperture 420 of the second end plate 102 and is threadably received in a nut 240 disposed against the second end plate 102.

The second shoulder bolt 222 includes a head portion 1500, a shaft portion 1510, a shoulder portion 1520, and a threaded portion 1530. The shaft portion 1510 has a first end 1512 and a second end 1514. The first end 1512 extends from the head portion 1500. The shoulder portion 1520 is disposed at the second end 1514 of the shaft portion 1510. The threaded portion 1530 extends from the second end 1514 of the shaft portion 1510.

The second shoulder bolt 222 is disposed such that the head portion 1500 is disposed against the first end plate 100 and the shaft portion 1510 extends through the aperture 322 of the first end plate 100 and the aperture 922 of the frame member 180 and each respective adjacent aperture in the frame members 182-194, and the shoulder portion 1520 is disposed against the second end plate 102 and the threaded portion 1530 extends through the aperture 422 of the second end plate 102 and is threadably received in a nut 242 disposed against the second end plate 102.

The third shoulder bolt 224 includes a head portion 1600, a shaft portion 1610, a shoulder portion 1620, and a threaded portion 1630. The shaft portion 1610 has a first end 1612 and a second end 1614. The first end 1612 extends from the head portion 1600. The shoulder portion 1620 is disposed at the second end 1614 of the shaft portion 1610. The threaded portion 1630 extends from the second end 1614 of the shaft portion 1610.

The third shoulder bolt 224 is disposed such that the head portion 1600 is disposed against the first end plate 100 and the shaft portion 1660 extends through the aperture 324 of the first end plate 100 and the aperture 1020 of the frame member 180 and each respective adjacent aperture in the frame members 182-194, and the shoulder portion 1620 is disposed against the second end plate 102 and the threaded portion 1630 extends through the aperture 424 of the second end plate 102 and is threadably received in a nut 244 disposed against the second end plate 102.

The fourth shoulder bolt 226 includes a head portion 1700, a shaft portion 1710, a shoulder portion 1720, and a threaded portion 1730. The shaft portion 1710 has a first end 1712 and a second end 1714. The first end 1712 extends from the head portion 1700. The shoulder portion 1720 is disposed at the second end 1714 of the shaft portion 1710. The threaded portion 1730 extends from the second end 1714 of the shaft portion 1710.

The fourth shoulder bolt 226 is disposed such that the head portion 1700 is disposed against the first end plate 100 and the shaft portion 1760 extends through the aperture 326 of the first end plate 100 and the aperture 1022 of the frame member 180 and each respective adjacent aperture in the frame members 182-194, and the shoulder portion 1720 is disposed against the second end plate 102 and the threaded portion 1730 extends through the aperture 426 of the second end plate 102 and is threadably received in a nut 246 disposed against the second end plate 102.

Figure 3:
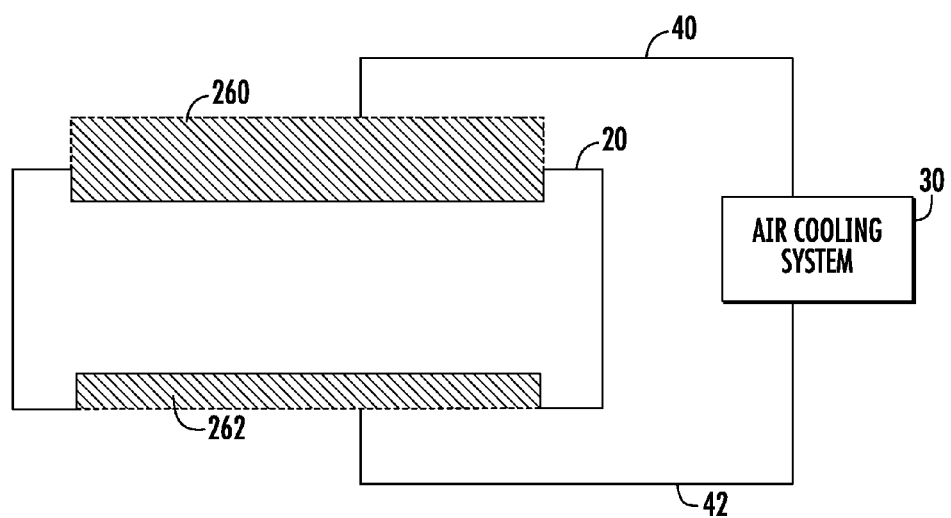
FIG. 3 is a block diagram of a battery system utilizing the battery module of FIG. 1.

Referring to FIGS. 3 and 4, the manifold 260 is configured to route air from the conduit 40 into the apertures in the first peripheral walls (e.g., upper walls) of the frame members 180-194 which flows through the plurality of flow channels 1190 to the apertures in the second peripheral walls (e.g., lower walls) of the frame members 180-194. The manifold 262 is configured to receive the air from the apertures in the second peripheral walls of the frame members 180-194 and to route the air into the conduit 42. The conduit 42 routes the air to the air cooling system 30.

Referring to FIGS. 7, 9 and 22-24, a flowchart of a method for assembling the battery module 20 in accordance with another exemplary embodiment is provided. For purposes of simplicity, the method will only describe the assembly process utilizing first and second battery cells and a single frame member. Of course, it should be understood that the method can be implemented utilizing a plurality of additional frame members and a plurality of additional battery cells.

At step 1800, an operator provides the end plate 100 having the apertures 320, 322, 324, 326 extending therethrough.

At step 1802, the operator provides the frame member 180 having the apertures 920, 922, 1020, 1022 extending therethrough.

At step 1804, the operator provides the battery cells 120, 122.

At step 1806, the operator provides the end plate 102 having the apertures 420, 422, 424, 426 extending therethrough.

At step 1808, the operator provides the first shoulder bolt 220 having the head portion 1400, the shaft portion 1410, the shoulder portion 1420, and the threaded portion 1430. The shaft portion 1410 has the first end 1412 and the second end 1414. The first end 1412 of the shaft portion 1410 extends from the head portion 1400. The shoulder portion 1420 is disposed at the second end 1414 of the shaft portion 1410. The threaded portion 1430 extends from the second end of the shaft portion 1410.

At step 1810, the operator provides the second shoulder bolt 222 having the head portion 1500, the shaft portion 1510, the shoulder portion 1520, and the threaded portion 1530. The shaft portion 1510 has the first end 1512 and the second end 1514. The first end of the shaft portion 1510 extends from the head portion 1500. The shoulder portion 1520 is disposed at the second end 1514 of the shaft portion 1510. The threaded portion 1530 extends from the second end 1514 of the shaft portion 1510.

At step 1820, the operator provides the shoulder bolt 224 having the head portion 1600, the shaft portion 1610, the shoulder portion 1620, and the threaded portion 1630. The shaft portion 1610 has the first end 1612 and the second end 1614. The first end 1612 of the shaft portion 1610 extends from the head portion 1600. The shoulder portion 1620 is disposed at the second end 1614 of the shaft portion 1610. The threaded portion 1630 extends from the second end 1614 of the shaft portion 1610.

At step 1822, the operator provides the fourth shoulder bolt 226 having the head portion 1700, the shaft portion 1710, the shoulder portion 1720, and the threaded portion 1730. The shaft portion 1710 has the first end 1712 and the second end 1714. The first end 1712 of the shaft portion 1710 extends from the head portion 1700. The shoulder portion 1720 is disposed at the second end 1714 of the shaft portion 1710. The threaded portion 1730 extends from the second end 1714 of the shaft portion 1710.

At step 1824, the operator disposes the battery cell 120 between the end plate 100 and the frame member 180.

At step 1826, the operator disposes the battery cell 122 between the end plate 102 and the frame member 180.

At step 1828, the operator positions the first shoulder bolt 220 such that the head portion 1400 is disposed against the end plate 100 and the shaft portion 1410 extends through the aperture 320 of the end plate 100 and the aperture 920 of the frame member 180, and the shoulder portion 1420 is disposed against the end plate 102 and the threaded portion 1430 extends through the aperture 420 of the end plate 102 and is threadably received in the nut 240 disposed against the end plate 102.

At step 1840, the operator positions the second shoulder bolt 222 such that the head portion 1500 is disposed against the end plate 100 and the shaft portion 1510 extends through the aperture 322 of the end plate 100 and the aperture 922 of the frame member 180, and the shoulder portion 1520 is disposed against the end plate 102 and the threaded portion 1530 extends through the aperture 422 of the end plate 102 and is threadably received in the nut 242 disposed against the end plate 102.

At step 1842, the operator positions the third shoulder bolt 224 such that the head portion 1600 is disposed against the end plate 100 and the shaft portion 1610 extends through the aperture 324 of the end plate 100 and the aperture 1020 of the frame member 180, and the shoulder portion 1620 is disposed against the end plate 102 and the threaded portion 1630 extends through the aperture 424 of the end plate 102 and is threadably received in the nut 244 disposed against the end plate 102.

At step 1844, the operator positions the fourth shoulder bolt 226 such that the head portion 1700 is disposed against the end plate 100 and the shaft portion 1710 extends through the aperture 326 of the end plate 100 and the aperture 1022 of the frame member 180, and the shoulder portion 1720 is disposed against the end plate 102 and the threaded portion 1730 extends through the aperture 426 of the end plate 102 and is threadably received in the nut 246 disposed against the end plate 102.

The battery module 20 provides a substantial advantage over other battery modules. In particular, the battery module 20 is configured such that a flow path of any gases output by the battery cells is isolated and separate from a plurality of flow paths of air flowing through first and second thermally conductive plates for cooling the battery module 20.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery module, comprising:

a first battery cell having first and second electrical terminals;

a frame member having first and second sides, first, second, third and fourth peripheral walls, and first and second thermally conductive plates; the first side of the frame member being disposed against the first battery cell;

the first and second peripheral walls being generally parallel to one another and being disposed between and coupled to the third and fourth peripheral walls; the first, second, third and fourth peripheral walls defining an open interior region therebetween; the first peripheral wall having a first plurality of apertures extending therethrough, the second peripheral wall having a second plurality of apertures extending therethrough;

the first and second thermally conductive plates being coupled together with at least one weld joint;

the first thermally conductive plate having first, second, and third peripheral portions extending into and coupled to the first, second, and third peripheral walls, respectively, the first thermally conductive plate adapted to enclose the open interior region proximate to the first side of the frame member, the first thermally conductive plate being disposed directly on and against the first battery cell;

the second thermally conductive plate having first, second, and third peripheral portions disposed within and coupled to the first, second, and third peripheral walls, respectively, the third peripheral portion of the second thermally conductive plate being disposed directly against and contacting the third peripheral portion of the first thermally conductive plate within the third peripheral wall, the second thermally conductive plate adapted to enclose the open interior region proximate to the second side of the frame member such that a plurality of flow channels are formed by the first and second thermally conductive plates between the first and second thermally conductive plates, the first and second thermally conductive plates extending through at least a portion of the first peripheral wall, and an upper end portion of the first thermally conductive plate and an upper end portion of the second thermally conductive plate in the first peripheral wall form an upper open end of each of the plurality of flow channels, each aperture of the first plurality of apertures extending through the first peripheral wall fluidly communicating with the upper open end of a respective flow channel of the plurality of flow channels; a number of the plurality of flow channels being equal to a number of the first plurality of apertures;

the first and second thermally conductive plates extending through at least a portion of the second peripheral wall, and a lower end portion of the first thermally conductive plate and a lower end portion of the second thermally conductive plate in the second peripheral wall form a lower open end of each of the plurality of flow channels, each aperture of the second plurality of apertures extending through the second peripheral wall fluidly communicating with the lower open end of a respective flow channel of the plurality of flow channels; the number of the plurality of flow channels being equal to a number of the second plurality of apertures; and the first thermally conductive plate extracting heat energy from the first battery cell when air flows through the plurality of flow channels defined by the first and second thermally conductive plates.

2. The battery module of claim 1, wherein the first thermally conductive plate further having a fourth peripheral portion extending into and coupled to the fourth peripheral wall, and the second thermally conductive plate further having a fourth peripheral portion extending into and coupled to the fourth peripheral wall, and the fourth peripheral portion of the second thermally conductive plate being disposed directly against and contacting the fourth peripheral portion of the first thermally conductive plate within the fourth peripheral wall.

3. A battery module, comprising:

a first battery cell having first and second electrical terminals;

a frame member having first, second, third and fourth peripheral walls, and first and second thermally conductive plates; the frame member being disposed against the first battery cell;

the first and second peripheral walls being disposed between and coupled to the third and fourth peripheral walls; the first and second peripheral walls being generally parallel to one another and being disposed between and coupled to the third and fourth peripheral walls; the first, second, third and fourth peripheral walls defining an open interior region therebetween; the first peripheral wall having a first plurality of apertures extending therethrough, the second peripheral wall having a second plurality of apertures extending therethrough;

the first thermally conductive plate having first, second, and third peripheral portions extending into and coupled to the first, second, and third peripheral walls, respectively, the first thermally conductive plate adapted to enclose the open interior region; the first thermally conductive plate being disposed against the first battery cell, the first thermally conductive plate extending in a first direction from the first peripheral wall to the second peripheral wall;

the second thermally conductive plate having first, second, and third peripheral portions extending into and coupled to the first, second, and third peripheral walls, respectively; the third peripheral portion of the second thermally conductive plate being disposed directly against and contacting the third peripheral portion of the first thermally conductive plate within the third peripheral wall; the second thermally conductive plate adapted to enclose the open interior region; the first and second thermally conductive plates defining a plurality of flow channels therebetween;

an upper end portion of the first thermally conductive plate and an upper end portion of the second thermally conductive plate extending through at least a portion of the first peripheral wall in the first direction and contacting the first peripheral wall, the upper end portion of the first thermally conductive plate and the upper end portion of the second thermally conductive plate forming an upper open end of each of the plurality of flow channels that fluidly communicate with a respective aperture of the first plurality of apertures; a number of the plurality of flow channels being equal to a number of the first plurality of apertures;

a lower end portion of the first thermally conductive plate and a lower end portion of the second thermally conductive plate extending through at least a portion of the second peripheral wall in the first direction and contacting the second peripheral wall, the lower end portion of the first thermally conductive plate and the lower end portion of the second thermally conductive plate forming a lower open end of each of the plurality of flow channels that fluidly communicate with a respective aperture of the second plurality of apertures; the number of the plurality of flow channels being equal to a number of the second plurality of apertures;

the first thermally conductive plate extracting heat energy from the first battery cell when air flows through the first plurality of apertures of the first peripheral wall, and the plurality of flow channels, and the second plurality of apertures of the second peripheral wall.

4. The battery module of claim 1, wherein the third peripheral wall includes a first outlet configured to receive the first electrical terminal of the first battery cell therethrough, the battery module further comprising:

a first end plate being disposed against the first battery cell such that the first battery cell is disposed between the frame member and the first end plate;

the frame member further having first and second elastomeric sealing members, the first elastomeric sealing member being disposed on the first peripheral wall on a first side of the frame member, a first end of the first elastomeric sealing member terminating on an upper portion of the third peripheral wall on the first side of the frame member, and a second end of the first elastomeric sealing member terminating on an upper portion of the fourth peripheral wall on the first side of the frame member, the second elastomeric sealing member being disposed on the second peripheral wall on the first side of the frame member, a first end of the second elastomeric sealing member terminating on a lower portion of the third peripheral wall on the first side of the frame member, and a second end of the second elastomeric sealing member terminating on a lower portion of the fourth peripheral wall on the first side of the frame member, the first and second elastomeric sealing members contacting the first end plate and being adapted to route gases from the first battery cell toward the first outlet disposed between the first and second elastomeric sealing members such that the gases are isolated from the air flowing through the plurality of flow channels.

5. The battery module of claim 1, wherein the first thermally conductive plate includes an outer surface defining a plurality of flat ridge surface portions and a plurality of tread surface portions, a first tread portion of the plurality of tread portions being disposed between first and second flat ridge surface portions of the plurality of flat ridge surface portions; and a second tread portion of the plurality of tread portions being disposed between the second flat ridge surface portion and a third flat ridge surface portion of the plurality of flat ridge surface portions, the first battery cell being disposed directly on and against the plurality of flat ridge surface portions.

6. The battery module of claim 1, wherein each upper open end of each respective flow channel of the plurality of flow channels has a one-to-one correspondence with a respective aperture of the first plurality of apertures in the first peripheral wall; and each lower open end of each respective flow channel of the plurality of flow channels has a one-to-one correspondence with a respective aperture of the second plurality of apertures in the second peripheral wall.

7. The battery module of claim 3, wherein the first thermally conductive plate includes an outer surface defining a plurality of flat ridge surface portions and a plurality of tread surface portions, a first tread portion of the plurality of tread portions being disposed between first and second flat ridge surface portions of the plurality of flat ridge surface portions; and a second tread portion of the plurality of tread portions being disposed between the second flat ridge surface portion and a third flat ridge surface portion of the plurality of flat ridge surface portions, the first battery cell being disposed directly on and against the plurality of flat ridge surface portions.

8. The battery module of claim 3, wherein each upper open end of each respective flow channel of the plurality of flow channels has a one-to-one correspondence with a respective aperture of the first plurality of apertures in the first peripheral wall; and each lower open end of each respective flow channel of the plurality of flow channels has a one-to-one correspondence with a respective aperture of the second plurality of apertures in the second peripheral wall.

* * * * *